United States Patent [19]

Johnson et al.

[11] 4,134,464
[45] Jan. 16, 1979

[54] IN-MOTION CAR WEIGHING SYSTEM

[75] Inventors: Bernard A. Johnson, Deerfield, Ill.; Thomas M. Parkinson, Cwnbran Gwent, England

[73] Assignee: Mangood Corporation, Chicago, Ill.

[21] Appl. No.: 809,028

[22] Filed: Jun. 22, 1977

[51] Int. Cl.² .................... G01G 19/04; G01G 19/413
[52] U.S. Cl. .......................................... 177/3; 177/25; 177/163; 177/DIG. 8; 364/567
[58] Field of Search ................ 177/163, DIG. 8, 25, 177/1, 3, 134; 364/567, 436; 246/247, 122 R, 77

[56] References Cited

U.S. PATENT DOCUMENTS

| 3,374,844 | 3/1968 | Rogers | 177/163 X |
| 3,646,327 | 2/1972 | Tonies | 177/163 X |
| 3,825,734 | 7/1974 | Jacobs | 364/567 |
| 3,959,636 | 5/1976 | Johnson | 364/567 X |

Primary Examiner—Joseph W. Hartary
Attorney, Agent, or Firm—Claron N. White

[57] ABSTRACT

A system for bidirectional in-motion weighing of freight cars of a train includes a weighbridge, first and second sets of load cells, three wheel sensing devices, a control device, a device initiated by the control device for weighing operations, and a printer for the total car weight. The sets of load cells are mounted to receive the load from opposite ends of the weighbridge. Each set has a rapid change of output voltage when an axle enters or leaves the associated weighbridge end. The weighbridge is located between two spaced, aligned tracks and has a third track. The three tracks provide a path of train travel. Each wheel sensing device has a component to provide a signal when a wheel passes. Two components are mounted beside the first two tracks a predetermined distance from opposite ends of the third track. The third component is located beside one of the three tracks a predetermined distance from one end of the third track. The control device counts axles passing the first or second component, counts axles entering the nearer end of the weighbridge, and determines the number of axles of a car from the first coincident count of axles. The component of the third wheel sensing device senses an axle while passing through a zone and determines a normal print out of freight car weight if there is a coincident presence of an axle within that zone and an axle at the associated end of the weighbridge for all adjacent axles of each truck.

34 Claims, 5 Drawing Figures

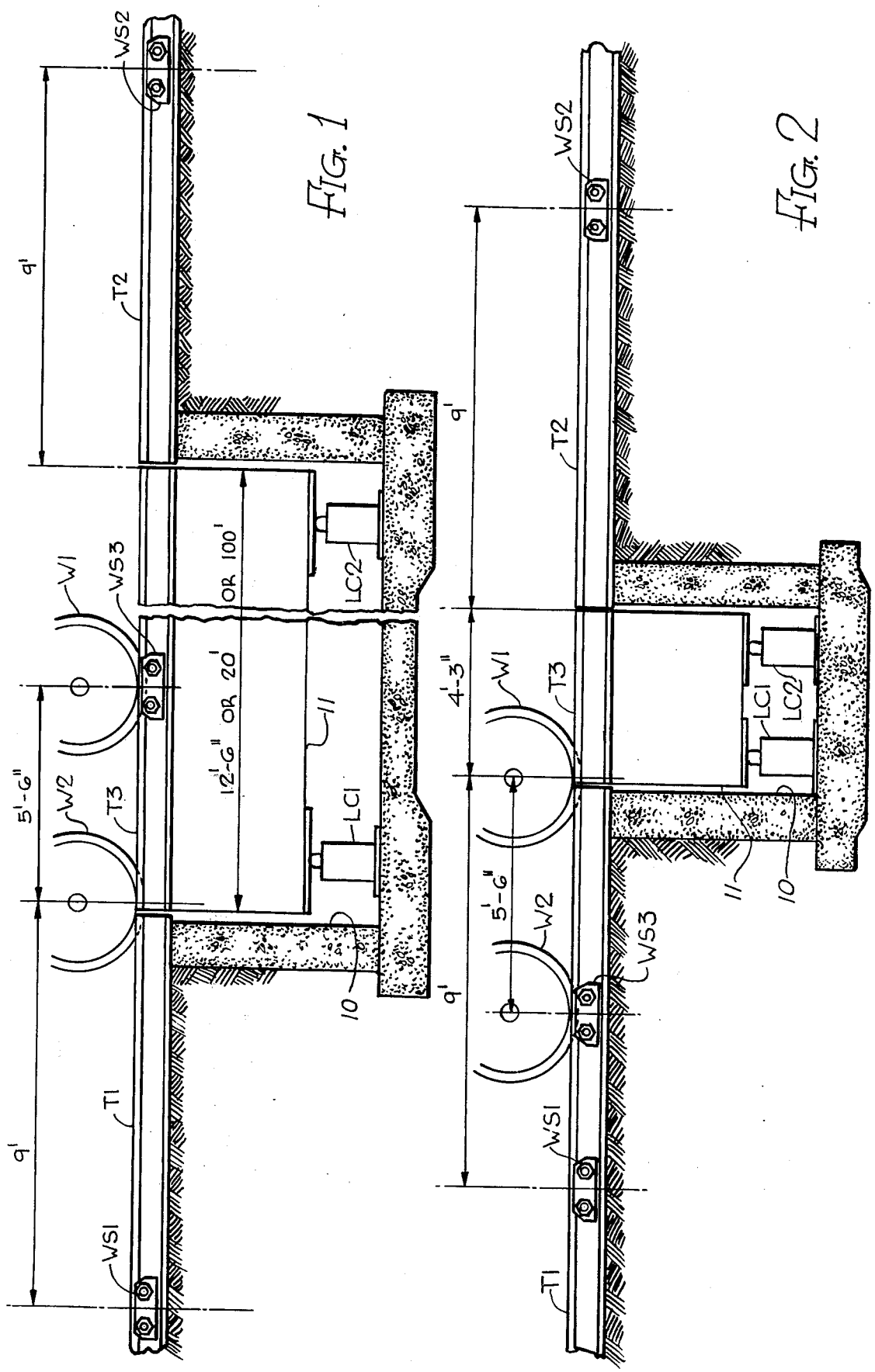

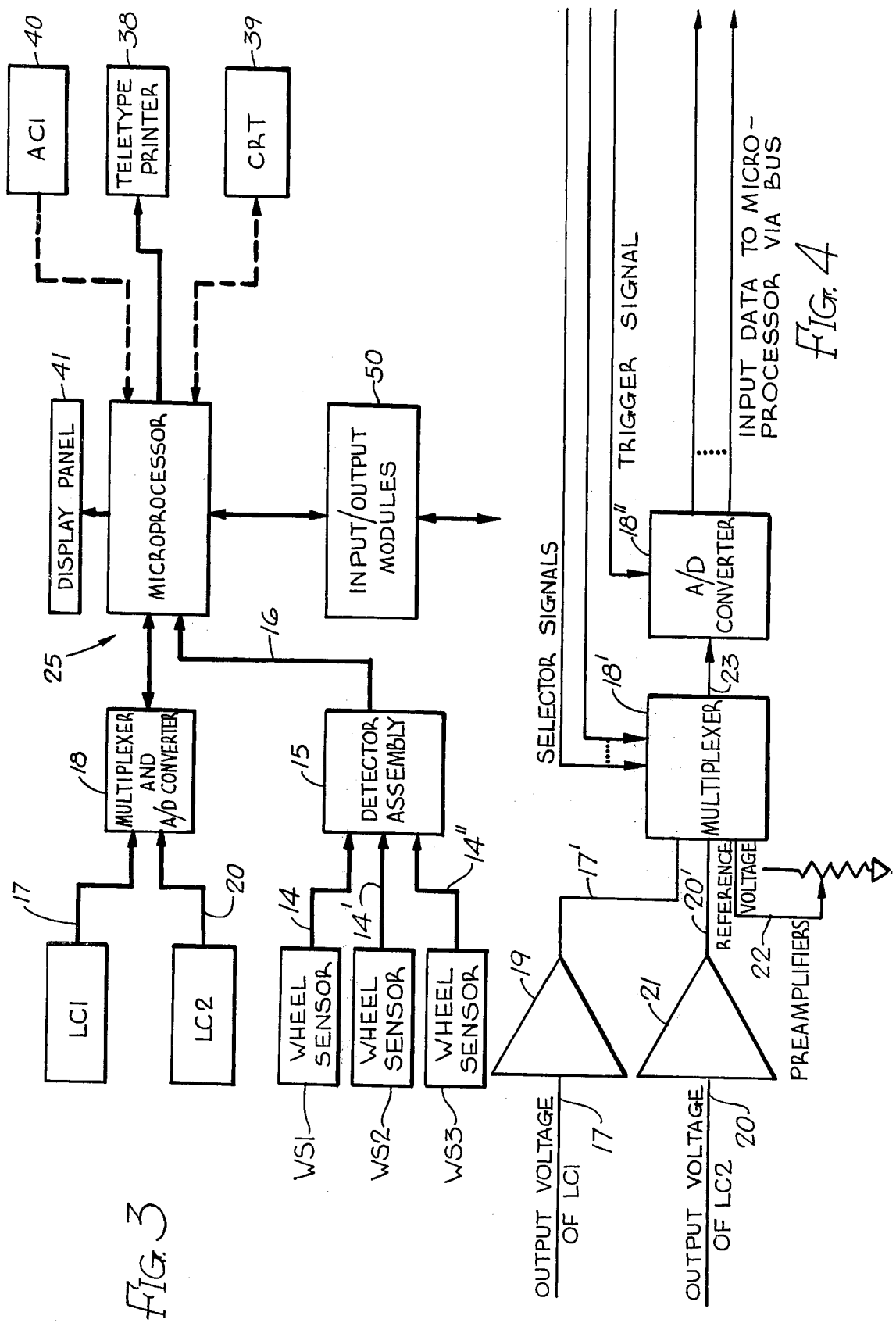

4,134,464

IN-MOTION CAR WEIGHING SYSTEM

SUMMARY OF THE INVENTION

The system of the present invention is a system for in-motion weighing of freight cars. The system includes spaced first and second tracks having aligned pairs of rails and a weighbridge that is mounted between the first and second tracks. The weighbridge includes a third track, as its platform, and the three tracks provide a path of travel for the cars. There are gaps between the ends of the pair of rails of the third track and the adjacent ends of the rails of the other two tracks. For more suitable transition of the weight of an axle car, to or from the rails of the third track, the gaps are angled gaps.

The system also includes two sets of load cells that are located on opposite sides of a transverse vertical central plane of the weighbridge. The load cells of each set are connected so that the set will provide an output voltage. Each set is located to receive, from a different end of the weighbridge, the load on that end of the weighbridge and located to provide a rapid change of output voltage whenever an axle of a car enters or leaves the associated end of the weighbridge. When the axle enters the weighbridge, the associated set of load cells provide a rapid rise of output voltage and when the axle exits that end of the weighbridge to pass on to the adjacent track of the first two tracks there is a rapid decrease of output voltage.

The system further includes one, two or three wheel sensing means, control means, means operative in response to the control means for performing weighing operations when determined by the control means, and print means to print out the total weight of the freight car.

The simplest embodiment of the system of the invention is constructed for unidirectional weighing of uncoupled freight cars or of a group of two or more coupled freight cars. In this embodiment, the system includes only one wheel sensing means. In an embodiment for bidirectional weighing of uncoupled freight cars or groups of coupled freight cars, the system includes two wheel sensing means.

For the unidirectional weighing embodiment, the wheel sensing means has a component that is located beside the track, of the first and second tracks, along which each freight car or each group of freight cars passes before entering on to the track of the weighbridge. This location is spaced from the track of the weighbridge a distance that is greater than the distance between adjacent axles of a truck of the freight car and less than the distance between the inner axles of the trucks of a freight car. The wheel sensing means is constructed so that, when a wheel mounted on an axle of the freight car passes the location of the component of the wheel sensing means, a signal is provided at an output of the wheel sensing means.

When the system is the embodiment for bidirectional weighing of uncoupled freight cars or groups of coupled freight cars, the system includes the second wheel sensing means, as stated above. The second wheel sensing means has a component located beside the other track of the first two tracks so that it is spaced from the track of the weighbridge a distance that is also greater than the distance between adjacent axles of a truck of a freight car and less than the distance between the inner axles of the trucks of a freight car so that the second wheel sensing means provides a signal at an output when the wheel of an axle passes the location of the component of the second wheel sensing means.

The control means, that is present in each embodiment of the system of the invention, is connected to each of the two sets of load cells and to each wheel sensing means that is present in a specific embodiment. The control means is constructed to perform certain functions, namely, operations based on output voltage from each of the sets of load cells, when there is a rapid change of output voltage, and from the signals from each wheel sensing means in a specific embodiment. The two sets of load cells are connected to the control means that operatively uses the output voltage in an alternating manner.

For unidirectional weighing, the signals from the wheel sensing means, that is located said distance from one end of the weighbridge, are counted by the control means to provide a count of axles of a freight car passing the location of the component of that wheel sensing means as the axle moves towards the weighbridge. For bidirectional weighing, the signals from that wheel sensing means of the two wheel sensing means, that provides a signal each time a wheel moves toward the weighbridge, are counted to provide a count of axles of a freight moving toward the weighbridge. For unidirectional or bidirectional weighing, the control means counts the number of rapid rises of output voltage from the set of load cells that receive a load each time that an axle passes on to the associated end of the weighbridge. The control means is constructed to determine when the two counts of axles are in first coincidence and at that time determines the count of axles that represents the total number of axles of the freight car.

The control means is also constructed to provide a number of other functions including a determination when the count of the number of axles by one of the wheel sensing means, WS1 or WS2, depending upon the direction of car travel and the count of the number of rapid rises of output voltage are in coincidence, that count being one-half of the total number of axles of the freight car, to restart the count of signals from that wheel sensing means that has been counting axles moving toward the weighbridge, when the count is twice its count at the time of the coincident count, and to restart a count of rapid rises of output voltage when the count of rapid rises equals twice the count of the coincident count.

The control means is further constructed to provide a signal to the means operative in response to the control means to initiate a weighing operation. When that signal is provided, the means operative in response to the control means functions to perform the weighing operation. This signal is provided at a time that depends upon whether the weighing operation is one in which each axle is weighed separately, or if each truck is weighed separately, or if the entire car is weighed at one time.

If the system is constructed to provide axle weighing, the control means is constructed to initiate the means responsive to it for weighing each time that the control means is provided a rapid rise of output voltage and for totalling the weight of all axles of the freight car.

For truck weighing, the control means is constructed to determine when all of the axles of a truck have entered the weighbridge. This is provided by the control means when it determines the coincident count of axles. In a modification of this embodiment of the system, the signal from the control means to initiate a weighing operation is provided, to the means responsive to the control means, only after the axles on the weighbridge are only those of the truck to be weighed. The second truck of a freight car is weighed after the last axle of the car has entered the weighbridge and then the weights of the two trucks are totalled.

For entire car weighing, the control means is constructed to signal the means responsive to it for a weighing operation only after the last axle of the car has entered the weighbridge. That is determined when the count of rapid rises, that are counted by the control means, equals the number of axles of the freight car that have provided the count of rapid rises of output voltage at the time of the first coincident count for that car. In a modification for entire car weighing, the control means does not provide this initiating signal until the axles on the weighbridge are only the axles of the freight car to be weighed.

The means operative in response to the control means is connected alternately to the two sets of load cells during each of a number of cycles that constitute a weighing operation. During each cycle the output voltages from the two sets of load cells are converted to digital information. The two output voltages can be summed before the A/D conversion to provide digital information representing all of the weight on the weighbridge during weighing operations. Preferably, during each cycle, the output voltage from one of the two sets of load cells is converted to digital information representing the weight on that set of load cells and then the other set of load cells has its output voltage converted to digital information representing the weight on that other set of load cells. The digital information from each cycle converted from the output voltage of the one set of load cells is added to the digital information from the previous cycles of the number of cycles for the same set of load cells. The same occurs for the totalling of the digital information from that other set of load cells. At the completion of the number of cycles, the digital information totalled from both sets of load cells is averaged to provide the total weight on the weighbridge. Alternatively, the two digital informations obtained by each cycle can be totalled and these totals accumulated and then averaged for the number of cycles to provide the total weight on the weighbridge.

The control means and the means responsive to the control means can be provided by electrical circuitry including counters, A/D converter, switch means, etc. The functions of the control means and of the means responsive to the control means are preferably provided by a computer, either an analog computer or preferably a digital computer, in combination with an A/D converter. When a digital computer is used, it is a computer that has programs stored in PROMs and the computer provides a number of cycles of operation per second, in which for each cycle it performs a sequential scan for signals from each wheel sensing means that is present and of the output voltages from the two sets of load cells and makes logical decisions based on these input data.

The digital computer is preferably a microprocessor having a CPU, RAMs and PROMs that are connected to a master bus. The microprocessor is connected via the bus to an interface that is connected to each wheel sensing means, that is present, and to an interface connected by a high-speed multi-bit A/D converter to a multiplexer that is connected to the two sets of load cells. The microprocessor is constructed to provide at least 30 cycles of operations per second and to provide preferably at least about 60 cycles of operations per second.

The bus of the microprocessor has a data channel for transferring input-output digital information and has an address channel, so that the microprocessor can selectively address one of its interfaces to provide a particular function or to transfer digital information received by an interface as a signal from one of the wheel sensing means or by an interface as digital information from an A/D conversion of the output voltage from one of the sets of load cells and then that conversion of the output voltage from the other set of load cells.

When the system contains the microprocessor or other digital computer, the combination of it, the A/D converter and the multiplexer provide the functions of the control means and the means responsive to the control means. The A/D converter has its analog voltage input connected to the multiplexer. The voltage outputs of the two sets of load cells are connected to two different analog voltage inputs of the multiplexer. The switching of the multiplexer is provided by signals from an interface of the microprocessor. The A/D converter is triggered for an operation by a signal provided through another interface of the microprocessor.

The microprocessor functions to count the number of axles passing each wheel sensing means, that is provided, by a counting of each signal that results when a wheel passes either of the two wheel sensing means. The microprocessor functions in cooperation with the A/D converter and the multiplexer, to compare for each cycle the current and last weights, as digital information, from each set of load cells the difference, and, if above a minimum amount, indicates a rapid rise of output voltage from the associated set of the two sets of load cells. From this determination a storage of counts of axles entering the weighbridge is provided the microprocessor in its RAMs. The microprocessor, during each cycle of its operation, compares the stored counts from the wheel sensing means and from the rapid rises of output voltage from one of the sets of load cells to determine when there is a first coincident count of axles for which it provides a storage of that count and/or a count that is double the first coincident count for a car.

Each rapid rise of output voltage from one set of load cells is used by the program logic to initiate an axle weighing in which, for up to a predetermined number of cycles, the A/D converter provides a conversion of an output voltage from one set of load cells and then from the other set of load cells to digital informations, that are totalled and stored. For each cycle, the totalled digital information is added to the stored total digital informations of the preceding cycles until the completion of the predetermined number of cycles. The resultant accumulated total axle weight is averaged to provide the actual axle weight. Each axle weight is thus obtained and is added to the weights previously obtained for axles of the same car. The result is total car weight that is transferred from the microprocessor by its program to the print means for a print out when signalled by the microprocessor.

When the microprocessor is programmed for truck weighing, the microprocessor for each truck initiates a predetermined number of cycles in which for each cycle the digital information obtained from the output voltages of the two sets of load cells are totalled, and the totals are accumulated. This occurs after the first coincident count of axles mentioned above. The microprocessor is programmed to determine and store a count representing the number of axles of the car and for weighing the second truck to initiate a weighing operation for a predetermined number of cycles when the count of rapid rises equals the stored count representing the number of axles of the car.

From the foregoing, it is seen that the weighing system of the present invention can be constructed with only one wheel sensing means, for unidirectional weighing, or with only two wheel sensing means, for bidirectional weighing, whereas the weighing systems of the prior art require twice and usually require three times that number of wheel sensing means for counting axles, etc. This lesser number of wheel sensing means, that is required for the present system, is possible because the system is constructed to utilize one or both sets of load cells to function as wheel sensing means. The set of load cells provides this function in a more reliable manner than using conventional wheel sensing means. This is possible by the construction of the system of the present invention, because the system examines for unidirectional weighing only one set of load cells for a rapid rise of output voltage or for bidirectional weighing examines separately the two sets of load cells for a rapid rise of output voltages to determine when an axle enters the weighbridge and counts the axles entering the weighbridge. The system utilizes the separate output voltages of the two sets of load cells for a number of other functions in a programmed manner, in addition to determining from the first coincident count of axles of a car the number of axles of the car and thereby controls the weighing operation or operations for the car. The system provides separate conversions of the output voltages from the two sets of load cells for a programmed weighing operation that provides an averaged total weight of load on the two sets of load cells. The system can provide a display and/or a print out of the weight on each truck of each car as a record of weight distribution in the car. Because of this preferred construction, using the microprocessor with the A/D converter and the multiplexer, for the various functions in combination with a fewer number of wheel sensing means, the overall construction requires an installation of fewer components than used in prior constructions.

The sole wheel sensing means, for unidirectional weighing, and the two wheel sensing means, for bidirectional weighing, can be switches mounted on a rail of the associated truck to be closed by a flange of a wheel when the wheel passes that location. Preferably, the wheel sensing means comprises an inductive loop, an oscillator, a phase detector and an output driver circuit. The inductive loop is the component of the wheel sensing means that is mounted on a rail at the specified location spaced said predetermined distance from the third track. It is connected to the combination of the other components that can be located elsewhere, e.g., at the location of the A/D converter etc. This preferred type of wheel sensing means provides a signal when a wheel flange moves into the sensing zone of the loop. This zone of detection is illustratively about 8 inches long in a direction parallel to the rail. Although the output signal is obtained for as long as the wheel flange is within the zone, the electronic circuit of an illustrative wheel sensing means times out the signal after a few minutes. The illustrative wheel sensing means of this type is Streeter Amet Trak Det 750 that is made and sold by the assignee of the present patent application.

For unidirectional weighing or bidirectional weighing of vehicles of a train comprising freight cars and a locomotive, in which it is desired to print out the weight of the freight cars and either to inhibit the print out of the weight of the locomotive or to print out its weight with an indicia that the weight is that of a locomotive, the system includes another wheel sensing means, that is the type, mentioned above, that senses a wheel while it passes through a zone at which a component, e.g., an inductive loop, of the another wheel sensing means is located. The another wheel sensing means and the sole wheel sensing means constitute the two wheel sensing means in the system, when the system is constructed for unidirectional weighing whereas it is a third wheel sensing means when the system is constructed for bidirectional weighing. This another wheel sensing means has its component, e.g., an inductive loop, mounted beside one rail of the first, second or third track. That component is located so that its zone of detection is spaced from one end of the third track a distance such that an axle of any freight car to be weighed has its axle within that zone of detection when an adjacent axle of the same truck is at that one end of the track of the weighbridge.

Besides this coincidence of presence of adjacent axles of each truck of a freight car, the system utilizes a rapid change of output voltage from that associated set of load cells, when an axle has its wheels on or just went off that end of the weighbridge, and the sensing of an axle at the zone of detection of the another wheel sensing means at that time and determines that this is the condition for all such adjacent axles. The system requires this determination for all adjacent axles of each truck of the vehicle before there will be a normal print out of the weight of the vehicle, i.e., a print out of the weight of a freight car. In the event that one or more sets of adjacent axles of each truck fail to provide this coincidence of presence of axles, the system, because of its construction will inhibit the normal print out and will either provide a print out of the weight of the vehicle with the indicia that it is a locomotive or will inhibit any print out for that vehicle. There are some current locomotives in the United States that have a distance between the outer axles and the adjacent axle of each truck that is within the range of distances for adjacent axles of freight cars but the second and third axles of each truck are spaced a greater distance than the maximum distance of the range of distances for adjacent axles of a truck of a freight car. Most of the United States locomotives have all of their adjacent axles a distance greater than the distance between any adjacent axles of a truck of freight cars.

When the system is constructed to weigh vehicles of a train, the effective distance between the sole wheel sensing means, for unidirectional weighing, or the distances between the two wheel sensing means, for bidirectional weighing, and the adjacent end of the third track, is greater than the greatest distance between adjacent axles of each truck of a locomotive that is part of the train.

The another wheel sensing means has its voltage output connected to an input of the interface to which the sole wheel sensing means or the two wheel sensing means have their voltage outputs connected by other inputs. As a result, when the microprocessor addresses that interface it also receives and stores a signal whenever an axle passes through the zone of detection of the another wheel sensing means. This stored information is erased during a cycle of operation of the microprocessor after the axle has moved beyond that zone of detection. This stored information from that another wheel sensing means is not used to count axles but rather is used with a rapid change of output voltage, from the set of load cells associated with the end of the third track from which the another wheel sensing means is spaced, to provide the coincident presence of the adjacent axles at the two locations. As stated earlier, that coincident presence is required for all adjacent axles of each truck of the vehicle for a normal print out, that is a print out of a freight car weight.

The another wheel sensing means, that provides a zone detection of an axle and that is mounted beside one of the three tracks, can be an insulated rail section. However, in those installations in which it is necessary to locate this another wheel sensing means beside the first or second track, because the length of the weighbridge and its third track is shorter than the distance of the spacing of the another wheel sensing means from one end of the third track, this increases the cost of construction and installation. Such installation would be required when the system has a short weighbridge for axle weighing. For truck or entire car weighing, the insulated rail section could be a part of the construction of the weighbridge but this increases the cost of manufacture of the system. The present system is constructed, for this car detection etc., so that all adjacent axles of each truck of the vehicle are required to provide the coincident presence before the final determination is made that the vehicle is a freight car. This avoids a false determination for a locomotive of the limited type mentioned above.

The system of the invention in its various embodiments, because of the use of a rapid change of output voltage from one or both of the sets of load cells, is readily constructed and programmed to provide many other functions that are described later in the detailed description of the preferred embodiment of the system.

DESCRIPTION OF THE DRAWINGS

FIG. 1 is a schematic side view of a portion of one preferred embodiment of the system of the invention, showing the weighbridge, the two pairs of load cells at the opposite ends of the weighbridge, and three wheel sensors for bidirectional truck or entire car weighing.

FIG. 2 is a schematic side view of another preferred embodiment of the system, that is like FIG. 1 except that it is a construction using a shorter weighbridge for axle weighing.

FIG. 3 is a block diagram showing the two pairs of load cells, the wheel sensors, multiplexer and A/D converter, the microprocessor and other equipment of the system.

FIG. 4 is a block diagram showing the manner in which the pairs of load cells are connected by preamplifiers to the multiplexer to provide a voltage from one preamplifier and then a voltage from the other preamplifier to the A/D converter that is connected to the microprocessor and showing the control of the operations of the multiplexer and the A/D converter by the microprocessor.

DETAILED DESCRIPTION

Figure 5:
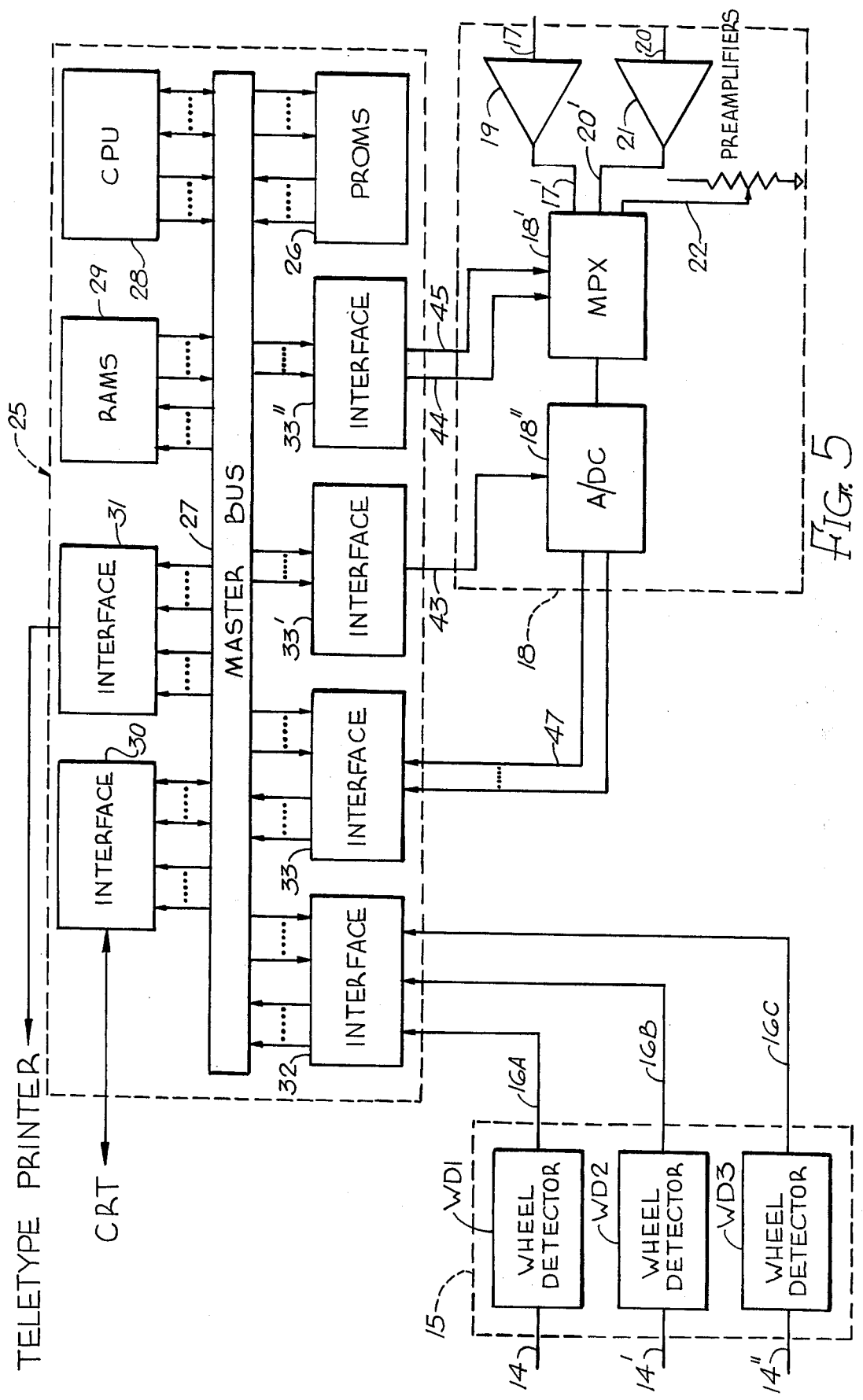
FIG. 5 is a block diagram showing the use of the master bus of the microprocessor to provide the communication between the CPU, the RAMs and PROMs, and the interface connections between the bus and components shown in FIGS. 3 and 4.

For the purpose of this description, unless stated otherwise, it is assumed that the vehicles are traveling from left to right in FIGS. 1 and 2. In both of these figures there are tracks T1 and T2 that have their rails in alignment. The rails T1 are spaced from the rails of track T2 and betwen the tracks is a pit 10 in which is located a weighbridge generally indicated at 11. A pair of rails of track T3 constitute the top part of the platform of weighbridge 11. The rails of track T3 are in alignment with the rails of tracks T1 and T2. There is an angled gap between the ends of the rails of track T3 and the ends of the rails of tracks T1 and T2. In FIGS. 1 and 2 are shown schematically two wheels W1 and W2 mounted on the first two axles of the leading truck of a freight car. For a 3-axle truck of a freight car there will be a third wheel to the left of wheel W2.

The description is based on the construction of the system for use with freight cars and the two types of locomotives in the United States mentioned earlier. It is a description of the system for bidirectional weighing of vehicles of a train. Weighbridge 11 of FIG. 1 is used for separately weighing the trucks of a vehicle, the length of weighbridge 11 is illustratively 12' 6" or 20'. The longer length is used if the system is to weigh vehicles of a train in which one or more of the vehicles has each truck with more than two axles. Of course, if there are more than three axles, the length may be required to be longer than 20'. For single-draft, i.e., the entire car, weighing the length of weighbridge 11 is illustratively 100'. The length of weighbridge 11 for axle weighing, that is shown in FIG. 2, is illustratively 4' 3".

The weighbridge 11 is supported by a set of load cells LC1 and a set of load cells LC2. These sets of load cells, illustrated by pairs of load cells, are located adjacent to the ends of the platform of weighbridge 11.

For the axle weighing or for two-draft (truck) weighing or for single-draft weighing of vehicles of a train, an inductive loop, hereinafter referred to as a wheel sensor WS1, is mounted on one of the rails of track T1. An inductive loop, hereinafter referred to as a wheel sensor WS2, is mounted on one of the rails of track T2. Each of wheel sensors WS1 and WS2 is located, so that the center of the length of its zone of detection, that is parallel to the rails, is illustratively 9', when the locomotive of the train is the normal type, from the nearer end of the platform of weighbridge 11. The rails of track T3 are in alignment with the rails of tracks T1 and T2. An inductive loop, hereinafter referred to as a wheel sensor WS3, is mounted on one of the rails of track T3 as shown in FIG. 1. It can be mounted on one of the rails of track T1 or track T2. The mounting on one of the rails of track T1 is shown in FIG. 2. For use in the United States, with the current spacing of adjacent axles of a truck of a freight car, wheel sensor WS3 is mounted so that the center of the length of its zone of detection that is parallel to the rails, is 5'6" from one end of the platform of weighbridge 11. For the present description, wheel sensor WS3 is located on track T3 or track T1, so that its center of detection is 5'6" from the end of the platform that is adjacent to track T1.

The inductive loop of each of wheel sensors WS1, WS2 and WS3 is connected by a pair of lines to wheel detectors WD1, WD2 and WD3, respectively. Each pair of lines is shown in FIGS. 3 and 5, as a single line for each connection. These lines are coaxial cables that are identified as lines 14, 14' and 14" for these respective connections. The three wheel detectors are within a detector assembly 15 (FIG. 3). Each of the combinations of the wheel sensor and wheel detector constitute a wheel sensing means. Each of the wheel detectors has a voltage output. Each output is connected to a line. These three lines are shown schematically by a line in FIG. 3. The three individual lines are shown in FIG. 5 where they are identified as lines 16A, 16B and 16C. For certain installations it may be necessary that wheel sensor WS3 provide a longer zone of detection. This can be done by using two inductive loops and connecting them to wheel detector WD3.

The pair of load cells LC1 is connected by a line 17 to a multiplexer and A/D converter generally indicated at 18 (FIG. 3). The multiplexer and A/D converter 18' comprise a multiplexer 18" and an A/D converter 18" (FIGS. 4 and 5). Actually, the output voltage of the pair of load cells LC1 is provided, as seen in FIGS. 4 and 5, by line 17 to an input of a preamplifier 19 and its output is connected by a line 17 to an input of multiplexer 18'. Actually, multiplexer 18' is connected to the output of preamplifier 19 by operational amplifier in a circuit with resistors and capacitors (all not shown). An illustrative multiplexer is Analogic's Multiplexer 506A. As seen in FIG. 3, the output of the pair of load cells LC2 is connected by a line 20 to multiplexer and A/D converter 18 in the same manner using a preamplifier 21 and an operational amplifier in a circuit with resistors and capacitors (all not shown) and with the connection to multiplexer 18' being provided by a line 20'. A third input of multiplexer 18' is connected to a line 22 that is connected to a reference voltage source.

The multiplexer 18' has an output that is connected by a line 23 to an input of A/D converter 18" that is a high-speed multi-bit A/D converter. The system has been used satisfactorily using 15-bit high-speed (250-μsec. conversion) model ADC 1570-U10-ST-ST converter made by Phoenix Data, Inc. or using 14-bit high-speed A/D converter model MP2814-4-A-2-C made by Analogic. The system of the invention, during each cycle of operation by its microprocessor, generally indicated at 25 (FIGS. 3 and 5), includes by the program logic of PROMS 26 of microprocessor 25 a scan and storage of multi-bit digital information from the multi-bit outputs of A/D converter 18 alternately based on the separate conversion of the output voltage from the pair of load cells LC1 and the pair of load cells LC2. Because of this separate conversion, it is possible to use the substantially less expensive 14-bit high-speed A/D converter instead of the 15-bit high-speed A/D converter. The latter would be required if the converter would be required to convert an output voltage representing the total weight on the weighbridge during the scan. Furthermore, as seen later, the separate conversions permit the use of one and both of the digital informations to perform many functions under the program logic.

Referring to FIG. 5, microprocessor 25 includes a master bus 27, a CPU 28, RAMs 29 and interfaces 30, 31, 32, 33, 33', and 33", as well as PROMs 26.

The microprocessor 25 is connected by interface 31 to a teletype printer 38 and microprocessor 25 is connected by interface 30 to an optional CRT 39. An ACI 40 can be connected to microprocessor 25.

The system includes a display panel 41 that is connected to microprocessor 25. The display panel 41 employs a single 6-digit LED display to include the accumulated axle or truck weight for a vehicle when two-draft weighing. A set of 18 status LEDs is also provided on panel 41 to display the mode of operation (auto, manual or setup), the status of the system (standby, ready or active), the direction of travel, an error, the speed (normal, limit or fast) motion (forward, reverse or inhibit) and the condition of the scale, i.e., weighbridge (loaded, zero or weigh).

The microprocessor 25 performs all the logic control as well as the data storage functions. The system uses illustratively an Intel 8080A microprocessor. The arrangement of microprocessor 25 with its CPU, PROMs, RAMs and the interfaces, that are connected to the wheel detectors WD1 through WD3, to the A/D converter 18", to multiplexer 18', to teletype printer 38, etc., is primarily the construction that is described in U.S. Pat. No. 3,959,636. Of course, the main difference is the control logic in PROMs 26.

The bus 27 includes an input/output data channel having eight data lines and an address channel having sixteen lines that address the various interfaces, RAMs 29 and PROMs 26. These connections to the two channels of bus 27 are provided by multi-line flat cables. The interfaces 33' and 33" are connected only to the address channel of bus 27.

When interface 33' is addressed, it passes a signal on one of the address lines via an output of interface 33' to a line 43 that is connected to the trigger input of A/D converter 18". When interface 33" is addressed by lines of the address channel of bus 27, two other lines of the address channel have signals that are passed by interface 33" to lines 44 and 45 that are connected to two inputs of multiplexer 18'. The combination of signals on lines 44 and 45, when changed, provide a switching operation of multiplexer 18' to change the connection to A/D converter 18" from one of lines 17', 20' and 22 to a different one of these lines.

Each time that interface 33 is addressed, it passes some of the digital information provided to the inputs of interface 33 by a set of fourteen lines 47 that are connected to the outputs of A/D converter 18". The microprocessor 25 addresses interface 33 to transfer first in parallel the eight least significant bits of digital information at the outputs of A/D converter 18" and then to transfer in parallel the balance of the bits. The preamplifier and the operational amplifier in circuitry are adjusted so that a weight on either of the pair of load cells is converted to digital information that is 1/20th of the actual weight. Thus, for a maximum weight of up to 400,000 lbs. on one of the pairs of load cells, the digital information is provided by the 14 bits.

When interface 32 is addressed by digital information on the address channel of bus 27, the signals, if any, on lines 16A, 16B and 16C are placed on lines of the data channel of bus 27.

When a train approaches the system, all controls, registers, etc., and various locations in memory are reset to zero. In the following description, the load on the pair of load cells LC1 is referred to as "weight of channel 1" and the load on the pair of load cells LC2 is referred to as "weight of channel 2" while the total weight on the scale 11 is referred to as "total scale weight".

The microprocessor 25 is programmed to perform for each cycle a sequential scan of the weight of channel 1 and the weight of channel 2 followed by a scan of the signals, if any, from wheel detectors WD1 through WD3 and then to make logical decisions based on these inputs. Various data bits are charged in various memory locations that then signal to other routines of the cycle any changes that have occurred.

At the start of each cycle, multiplexer 18' is already selecting channel 1 from the previous cycle, i.e., it is providing an output voltage to the input of A/D converter 18" from the pair of load cells LC1. The interface 33' is addressed to provide a trigger signal to converter 18". Because converter 18" takes up to 200 microseconds to settle the output, it is not read immediately. Then interface 33 is addressed for the serial transfer, in parallel of eight bits at a time, of the fourteen bits of data at the outputs of converter 18".

The RAMs 29 include a "current total scale weight" location, a "last total scale weight" location, a "current weight of channel 1" location, a "previous weight of channel 1" location, a "current weight of channel 2" location and a "last weight of channel 2" location. During the time that converter 18" is settling its output, the digital information in the "current total scale weight" location is transferred to the "last total scale weight" location.

A memory location is used to store axle detections during the cycle. It has a set of three registers, each with four bits, that are used to store axle-on and axle-off detections for each of the channels 1 and 2. During this settling time, the second and third registers are changed to the condition of the first and second registers, respectively, and any bits set in the first register are cleared.

A memory location also has three other sets of three registers for wheel sensors WS1 through WS3. For each set there is a transfer to the second and third registers of that set and any bits set in the first register of each of these three sets are cleared.

At the completion of the conversion and settling time, multiplexer 18' is switched to channel 2. Then interface 33 is addressed to input and store in the "current weight of channel 1". This current weight is also stored in the "current total scale weight" location. It is half of the scale weight for this cycle that is placed in this location.

Now the current weight of channel 1 and the previous weight of channel 1 are compared to look for any change. If the two weights do not differ by more than a predetermined difference, no further action is taken. If the two weights differ by an amount greater than the predetermined minimum difference, this is taken to indicate by the rapid rise or rapid decrease of the output voltage of the pair of load cells LC1 that an axle has come on or gone off, respectively, that end of the scale. If there is a rapid rise of output voltage indicated, the on-axle bit of the first register of the three registers for channel 1, mentioned above, is set. If there is a rapid decrease of output voltage the off-axle bit of that first register is set.

After the foregoing procedure, the scale weight input routine is continued. The A/D converter 18" is triggered again. During the conversion and settling time, the digital information in the "current weight of channel 2" location is transferred to the "previous weight of channel 2" location. After the settling time, the digital output of converter 18" is input and stored in the "current weight of channel 2" location. The multiplexer 18' is switched to channel 1. The current weight of channel 2 is also added to the weight stored in the "current total scale weight" location. This gives the total weight stored for this cycle of operation. The current weight of channel 2 and the previous weight, i.e., last weight, of channel 2 are now compared, in the same manner that those weights of channel 1 were compared, and if the difference indicates a rapid rise or rapid decrease of output voltage of the pair of load cells LC2 the on-axle bit or the off-axle bit, respectively, in the first register that relate to channel 2, is set.

For the next routine of the cycle, i.e., an axle detection check routine, the two on-axle bits and the two off-axle bits for each channel in the three registers are compared. If all three on-axle bits for channel 1 are set, an on-axle bit is set in a memory location, referred to as "AXDC" location, to indicate that an axle is on the end of the scale associated with the pair of load cells LC1. If all three of the axle-off bits of channel 1 are set, an off-axle bit is set in the AXDC location to indicate that an axle is now off that end of the scale. Similarly, one of the other axle-on and axle-off bits, for channel 2, of the AXDC location would be set if an axle has entered or passed off the other end of the scale.

When three successive scans provide a setting of one of the four bits of the AXDC location, the comparison of the three associated bits in the set of three registers is inhibited for the next twelve scans. If three scans have not provided a setting of the corresponding bits of the three registers, the system is programmed to reset these registers on the basis that there has been a false indication that an axle has passed onto or off of the particular end of the weighbridge.

Immediately following the foregoing axle detection check routine, a total scale weight routine is performed. It is used if the previous cycle had determined that the total scale weight is varying due to a moving load in a tanker or due to scale vibrations caused by a fast moving vehicle and the time had come to perform a weighing operation. If so, in the previous cycle an "unstable" bit in memory is set.

In that event, the "current total scale weight" is compared with the "last total scale weight". If the difference is large, then the scale is still unstable and the "unstable" bit remains set. If the difference is small, then the operation goes on to the next routine. The routine which determines whether to weight at this time, as well as the setting of the "unstable" indication, also stores a number in a location in memory called "NSAM", corresponding to the number of weight "samples" (one sample per cycle) that are required to obtain a satisfactory average weight. This NSAM location is now examined and, if it contains the number 000, the operation directly goes to the next routine. However, if the NSAM location contains a number, indicating that weighing is in progress, than the "current total scale weight" is added into a "total of A/D converter weights" memory location. The number in the NSAM location is then reduced by one to indicate that one more sample has been taken.

The stored digital information will eventually be averaged after all of the samples have been taken and added into that "total of A/D converter weights" location. The averaged total of A/D converter weights for all weighing operations of a vehicle are totalled eventually for axle or truck weighing and the total is transferred, or the single average total of A/D converter weights for the one-draft weighing is transferred, eventually to a car total weight storage.

In the next routine, microprocessor 25 inputs the signals from wheel detectors WD1 through WD3. This gives a record of axles being detected at this time. The storage is in the on-axle or off-axle bit of the first register of that set of three registers that is associated with the particular wheel detector. The first, second and third on-axle bits and the first, second and third off-axle bits of the three sets of registers are separately compared for each set associated with the detectors. If a change has occurred over three successive scans then an appropriate bit is stored in the on-axle or off-axle bits for the appropriate wheel detectors. Those "on" and "off" stored bits remain stored for the remainder of the cycle, but will be different for the next cycle in the case of the bits that relate to wheel detectors WD1 and WD2. This is because the first on-axle and off-axle bits relating to wheel detectors WD1 and WD2, if set, are reset during the conversion of the output voltage of channel 1 in the next cycle.

At this time all of the inputs of the system have been scanned and from now on the results from the foregoing routines are used to generate certain conditions that are necessary to determine the number of axles of the approaching vehicle and to determine the type of the vehicle.

As stated earlier, wheel sensor WS3 is located a specific distance from one end of the scale, so that every freight car, crossing the scale, will provide, each time there is an indication of one axle entering or leaving that end of the scale, a detection that an axle is within the range of detection of wheel sensor WS3. This coincidence of presence will occur for all adjacent axles of each truck of a freight car regardless of the direction of travel of the train. This coincident presence detection is the next routine in the cycle. In the following description of this coincident presence routine, it is assumed that the train is moving from left to right in FIG. 1 so that axles enter that end of the scale that is the specified distance from wheel sensor WS3.

In the coincident presence routine the on-axle bit of the AXDC memory for that end of the scale and the "on" bit and the "off" bit relating to wheel detector WD3 are examined. Before the first axle enters the scale, that on-axle bit of the AXDC memory is not set; therefore, the cycle of operation goes to the next routine.

When there is a cycle of operation in which that on-axle bit is set, the examination is made. However, the "on" bit relating to wheel detector WD3 is not set. As a result, a tentative non-coincidence bit is set. When the first axle moves further on to the scale, an examination during a cycle indicates that the on-axle bit of the AXDC memory is no longer set, but neither the "off" bit nor the "on" bit relating to wheel detector WD3 is set. As a result, the program for that cycle goes to the next routine.

When the second axle of the vehicle enters the scale, the coincident presence routine at the time of a cycle examines that on-axle bit of the AXDC memory relating to that end of the scale. Because it is now set, the "on" axle bit is examined to see if wheel detector WD3 is detecting an axle. If it is, because there is the coincidence of presence, the tentative non-coincidence bit is reset. If that "on" bit relating to wheel detector WD3 is not set, the tentative non-coincidence bit remains set.

When, during this coincident presence routine for a subsequent cycle, the on-axle bit of the AXDC memory for that end of the scale is no longer set, because the second axle has passed along the scale beyond that end of the scale, the "off" bit relating to wheel detector WD3 is examined. If that "off" bit is not set by wheel sensor WS3, the program goes to the next routine of the cycle. If that "off" bit is set, indicating an axle has left the detection length of wheel sensor WS3, the tentative non-coincidence bit is examined. If it is not set, the program goes to the next routine of the cycle. If it is set, a flag is set, indicating a lack of coincidence of presence because the spacing between the first and second axles is greater than that between the first and second axles of the first truck of a freight car.

When the flag is set, this coincidence check routine may be bypassed for the balance of the cycles until weighing is completed. When the flag is set, it inhibits the normal print out after the completion of the weighing of the vehicle. Instead the flag that is set can be used either to inhibit a print out of the weight of the vehicle or to provide a print out with an indicia that signifies the weight to be that of a locomotive.

If each truck of the vehicle has three axles, the third axle sets this on-axle bit of the AXDC memory. When this is indicated by a subsequent cycle, the "on" bit relating to wheel detector WD3 is examined. If it is set, there is coincidence of presence so that the tentative non-coincidence bit is not set. If that "on" bit is not set, the tentative non-coincidence bit is set.

After the third axle leaves that end of the scale, an examination during this coincidence presence routine in a later cycle will note that the second axle has not left or has left the detection length of wheel sensor WS3, because that "on" bit or that "off" bit associated with wheel detector WD3 will be set. If the "off" bit is not set, the program will leave this routine. If the "off" bit is set, the tentative non-coincidence bit is examined. If it is not set, the program will leave this routine. If the tentative non-coincidence bit is set, a flag will be set. This indicates a locomotive with freight car spacing between the first two axles but longer spacing between the second and third axles.

Even if the flag has been set, this checking for coincidence of presence will be repeated for a truck having four axles. The routine will check for a coincidence of presence of the third and fourth axles. Also the checking will be performed for the second truck. If desired, the flag, that may be set by the second truck, could be a different flag. To be sure that the vehicle is a freight car and that a coincident presence was not missed with resultant flag setting, there should be coincident presence of all pairs of adjacent axles for each truck to permit the normal print out. If programmed for two flags and only one is set, the vehicle is most likely a freight car, because there are many more freight cars in a train than locomotives. Thus, when there is coincident presence of all pairs of adjacent axles of one truck, but not for the other truck, the program may provide a normal print out.

When the train is moving from right to left, the program is a modification of that described above. This is because each of the axles is first in the length or zone of detection of wheel sensor WS3 before that axle passes to and off that end of the scale, namely, the end nearer to track T1. In that case, the off-axle bit for that end of the scale is used instead of the on-axle bit. The program that is used is determined by the direction of travel indicated, e.g., by which of wheel sensors WS1 and WS2 is operated first. Both programs are stored in PROMs 26.

If wheel sensor WS3 is located on track T1 or track T2 (in a modification of FIG. 1), the two programs based on the on-axle bit and the off-axle bit of the AXDC memory that relate to the end of the scale, that is the specified distance from wheel sensor WS3, are used. This is the case for the two constructions for axle weighing, one construction being shown in FIG. 2 and the other being really the same except for the use of the other pair of load cells (LC2) and the on-axle bit and the off-axle bit relating to that end of the scale.

In the next operation of each cycle, certain memory locations are updated to allow other routines to recognize the vehicles passing over the scale. There are the following location in memory: the ACNT counter; the DCNT counter; and the AOS counter.

The ACNT counter counts axles passing wheel sensor WS1 or wheel sensor WS2, dependent on train travel direction. This description assumes that the train is travelling from left to right in FIG. 1 or FIG. 2. Thus ACNT counts axles passing wheel sensor WS1 to provide signals from wheel detector WD1. When three successive cycles indicate that a wheel is detected as being at wheel sensor WS1, there is set an "on" bit as a result of a setting of three "on" bits, one in each of three registers, as described earlier, relating to wheel sensor WS1. That bit is examined each cycle and when it is set during a cycle the number in the ACNT memory is incremented. The ACNT is the count of axles passing position A, namely, wheel sensor WS1. That set "on" bit is reset in the next cycle while A/D converter 18" is digitizing the analog voltage of channel 1 as mentioned earlier.

The "on" bit, that when set will provide the count incrementing, is not set again by the axle although the three "on" bits, that when set result in it being set, may not change for six cycles during normal speed of the vehicles approaching the scale. That "on" bit is not set again to increment ACNT counter until another axle enters the zone of detection of wheel sensor WS1. When there are three successive cycles in which, as a result of the axle leaving the zone, the three "on" bits of the three registers are reset, an "off" bit is set. That "off" bit is useful for other purposes. It is reset in the next cycle while A/D converter 18" is digitizing the analog voltage of channel 1.

Next during every cycle the on-axle bit of the AXDC memory, relating to the entrance end of the scale in the direction of travel, is examined. If this bit is set, then the number in the DCNT memory (D count, i.e., count of axles detected as entering the scale) is incremented. This occurs after three successive cycles during which the on-axle bit in each of three registers of the set of registers for that end of the scale have been set. There is no change until after 12 more cycles after this occurs, because, after that on-axle bit of the AXDC memory is reset by the next cycle, the setting of the on-axle bit of the first register of the three registers is inhibited. Thus there is one incrementing each time an axle enters the scale.

Also during each cycle the on-axle bits of the AXDC memory are examined. If either on-axle bit is set, the contents of the AOS counter is incremented. Next the two off-axle bits of the AXDC memory are examined. If either is set, then the contents of the AOS counter is decremented.

A routine for car classification keeps comparing the ACNT counter to the DCNT counter. When the counts are first equal, then the first truck has come on to the scale. A NOA (number of axles of the vehicle) register is set then to twice the count in the DCNT counter.

Now as the center of the vehicle crosses the scale, the count in the ACNT counter is incremented twice (by the first two axles of the second truck). When the count in the ACNT counter reaches the count in the NOA count, the ACNT counter is reset ready for the next vehicle. When the count in the DCNT counter reaches the NOA count, the DCNT counter is reset and at the same time an indication is set that the second truck of the vehicle is on the scale.

The foregoing determinations are independent of scale length; however, the decision of when to weigh is determined by the length of the scale as well as the vehicle movement.

If the adjustment of the system is made for axle weighing, then every axle that increments the count of the DCNT counter is weighed if, at that time, the count of the AOS counter indicates that only one axle is on the scale; otherwise, a weighing operation begins as soon as AOS=1 after the axle has moved on to the scale.

If the adjustment is for two-draft weighing (truck weighing), then the scale is weighed when the last axle of each truck is on the scale if, at that time, AOS=$\lambda$ NOA/2; otherwise, the weighing of the truck begins as soon as AOS=NOA/2 after the last axle of a truck has moved on to the scale. This limitation on the start of the weighing is useful for close coupled freight cars.

For entire vehicle (single-draft) weighing, the weighing operation is started when the last axle of the vehicle is on the scale if, at that time, AOS=NOA; otherwise, the weighing of the vehicle is delayed until AOS=$\lambda$ NOA after the last axle of the vehicle has moved on to the scale.

For all three types of weighing the total car weight is output to printer 38 after the completion of the weighing operation that follows the entry of the last axle of the vehicle on to the scale. If the flag bit has been set by adjacent axles of the vehicle or if there are two flag bits, each being settable by a different truck of the vehicle, and both are set, if that is to be the requirement, during the passage of the vehicle to, across and beyond the scale, the output to printer is inhibited, e.g., by a resetting of the bits in the total car weight memory, or is made with a signal to cause the weight to be printed with an indicia that the weight is that of a locomotive.

For certain locations of wheel sensor WS3 the coincidence presence of an axle at wheel sensor WS3 and an adjacent axle of the same truck at the appropriate end of the scale will not be determined, for at least the last pair of adjacent axles of the vehicle in one travel direction, until after the total car weight has been determined. In these embodiments the output is delayed until all axles have passed off the scale.

When a weighing operation (axle, truck or single-draft) is initiated, a number of samples (NSAM) is stored in a memory and a "limit speed timer" memory is reset. For axle weighing the number is illustratively 18 samples, i.e., cycles, during each cycle of which the digital information from channels 1 and 2 are totalled and added to the total from earlier samples. For truck weighing the number of samples is illustratively 30 samples. For single-draft weighing a larger number of samples, illustratively 90 samples, can be obtained.

The accumulated total is averaged to obtain the average total weight for the axle, truck or vehicle and, if axle or truck weighing, the averaged total weights are accumulated until the entire vehicle has been weighed.

On every cycle after the "limit speed timer" memory is reset, it is incremented until the contents are 128, i.e., 128 cycles have passed. Then the contents are no longer incremented.

A routine that operates every cycle looks at the number stored in the NSAM memory. If the number is not zero, then this routine checks to see if any of the two on-axle bits and the two off-axle bits of the AXDC memory is set at this time. This will occur when an axle is entering or exiting the scale. If so, the vehicle is moving too fast to provide the programmed number of samples. During the cycle in which this is detected, the following is then performed. The last two weight samples (current and last total scale weights) are subtracted from the total of the A/D converter weights. The number of samples so far taken, for division to calculate average weight, is reduced by 2. The contents of the NSAM memory are reset to zero to indicate that the weighing operation has been completed. This average weight will be suitable for some purposes, e.g., to provide information to a device that controls the operation of the automatic brake retarders in a hump yard.

As mentioned earlier, there is a routine of each cycle that looks at the number stored in the NSAM memory. If the number is zero, then this routine also checks to see if any of the two on-axle bits and the two off-axle bits of the AXDC memory is set at this time. If so, "limit speed timer" memory is checked. If the number there is greater than the number of cycles for samples by a value less than a predetermined value, the vehicle is not moving too fast, but the speed is approaching the limit speed that must not be exceeded for a suitable weighing.

In FIG. 3 there is shown input/output modules 50 that permit the system to receive and supply other digital input external of the system. This input allows microprocessor 25 to be controlled by remote contacts.

In normal operation a train to be weighed moves in one direction and the weighing control system maintains synchronization through a counting process. Moreover, even if wheel sensor WS1 (or wheel sensor WS2 for the other direction of train movement for weighing) should fail to sense each wheel, because of a broken flange or intermittent detector failure, the system logic will still normally maintain synchronism. However, under certain conditions such as when wheel sensor WS1 (or wheel sensor WS2 for the other direction) fails to operate at all, synchronism can be lost. Should this occur, the condition will be detected and the system will be returned to synchronization during the subsequent vehicle. No more than one vehicle will be affected unless the wheel sensor malfunction repeats. This is made possible with a center of car logic in microprocessor 25.

Also, if the train is backing up, this condition will be detected. The number of axles the train has reversed will be counted. Subsequently when the train begins to move forward again, the system will not return to the normal weighing operation until all of these axles have been counted back. Typically, wheel roll back will not affect synchronism.

The microprocessor with its PROMs and RAMs allows the system to store weights of an incoming train and later subtract these weights from those obtained from an outgoing train to compute net weights. It is unimportant to this calculation whether the cars are loaded coming in or leaving. A 250-car random access memory is standard. If there is ACI, the system determines tare and computes net automatically. If there is no ACI, the system can operate sequentially substracting the weights from those recorded earlier. The logic can be based on first in, first out (FIFO) or last in, first out (LIFO). The system can be combined with manual tare or car identification entry to compute net automatically.

The automatic self-testing construction of the system has several functions. It periodically checks the calibration by switching in the reference voltage from line 22 by the third combination of signals from bus 27 to multiplexer 18'. It automatically performs complete logic checks by periodically testing the check sums in PROMs; if correct, the complete system logic is verified. It also checks RAMs. Finally it checks the sequence of the operation of wheel sensor WS1 or wheel sensor WS2 and the pair of load cells LC1 and LC2 during the train weighing operation and identifies any malfunction.

The foregoing presents preferred embodiments. Claims refer to a rapid change of output voltage of a set of load cells representing the passage of an axle on to or off the weighbridge. Such terminology includes the use of peak detection or a change after a peak that occurs after the axle has entered or when it leaves the weighbridge.

We claim:

1. A system for in-motion weighing of freight cars that comprises:

spaced first and second tracks having aligned pairs of rails;

a weighbridge, that is mounted between said first and second tracks and that has a third track, as the platform of said weighbridge, with gaps between the ends of its pair of rails and the rails of said first and second tracks, said first, second and third tracks providing a path of travel for the cars;

first and second sets of load cells, said sets being mounted under said platform on opposite sides of the central transverse plane of said weighbridge and the load cells of each set of load cells being connected to provide an output voltage corresponding to the weight of the load applied to that set of load cells and located to provide a rapid rise of output voltage from said first set of load cells when an axle passes onto the adjacent end of said weighbridge;

wheel sensing means having a component mounted beside one of said rails of said first track and spaced from said first end of said third track of said weighbridge a distance greater than the distance between adjacent axles of a truck of a freight car and a distance less than the distance between the inner axles of trucks of a freight car, said component being constructed to provide a signal at an output in response to a wheel of an axle passing the location of said component;

control means that is connected to said first and second sets of load cells and to said wheel sensing means and that is constructed:

to count the signals from said wheel sensing means as a count of the number of axles of a freight car passing the location of said component of said wheel sensing means;

to count the number of rapid rises of output voltage from said first set of load cells as a count of axles of a freight car passing onto said adjacent end of said weighbridge;

to determine a count representing the total number of axles of the freight car, when the counts of signals from said wheel sensing means and the counts of rapid rises of output voltage from said first set of load cells are in first coincidence;

to determine when the count of the number of rapid rises of output voltage from said first set of load cells is the count representing total number of axles of the freight car;

to restart the count of signals from said wheel sensing means whenever the count of signals from said wheel sensing means is twice its count at the time of the coincidence; and to restart the count of rapid rises of output voltage from said first set of load cells when its count is twice the count at the time of the coincidence;

means operative in response to said control means:

for axle weighing, after said control means has counted each rapid rise of output voltage from the first set of load cells, to convert the output voltages, from said first and second sets of load cells, for a first predetermined period of time to digital information corresponding to the weight of an axle on the weighbridge and to total the weights of axles, including the weight of the axle that provides the last rapid rise of output voltage from said first set of load cells by which said control means determines that the count of rapid rises is the count representing the total number of axles of the freight car; or for truck weighing, after said control means has determined that the count of signals from said wheel sensing means and the count of rapid rises of output voltage from said first set of load cells are in said coincidence, to convert the output voltages from said first and second sets of load cells for a second predetermined period of time to digital information corresponding to the weight of a truck of the freight car on the weighbridge, to repeat the conversion for said second predetermined period of time, after said control means has determined that the count of rapid rises of output voltage is the count representing the total number of axles of the freight car, to digital information that corresponds to the weight of the other truck of the freight car on the weighbridge, and then to total the weights of the two trucks of the freight car; or for entire car weighing, after said control means has determined that the count of rises of output voltage from said first set of load cells is the count representing the total number of axles of the freight car, to convert the output voltages from said first and second sets of load cells for a third predetermined period of time to digital information corresponding to the total weight of said freight car; and print means to print out the total weight of the freight car in response to said control means that provides a signal after the total weight of the freight car has been obtained.

2. The system of claim 1, for use in coupled in-motion weighing of freight cars, to operate even though there has been no coincident count, even though all axles of the first truck of a freight car have passed onto the weighbridge, due to failure of operation of said wheel sensing means, and to return the system to synchronization for the weighing of the next car, said system having said control means further constructed:

to change the count of signals from said wheel sensing means to the count of rapid rises of output voltage from said first set of load cells, when the last axle of the first truck of the freight car has passed off the weighbridge as determined, after an incrementing of a count from an initial value each time there is a rise of output voltage of said first set of load cells and after decrementing a count each time there is a rapid decrease of output voltage from said second set of load cells until that count returns to the initial value;

to determine based on the count of rapid rises of output voltage from said first set of load cells, after said return of said count to its initial value, the count representing the total number of axles of the freight car;

to restart the count of signals from said wheel sensing means after this count equals the count representing the total number of axles of the freight car; and to restart the count of rapid rises of output voltage from said first set of load cells when this count equals the count representing the total number of axles of the freight car.

3. The system of claim 1 for use in the weighing of railroad vehicles of a train having freight cars and a locomotive, wherein:

said component of said wheel sensing means is spaced from said third track a distance greater than the distance between any adjacent axles of a truck of a locomotive of any train that is to have vehicles of that train weighed by the system.

4. The system of claim 3 wherein said system further includes:

another wheel sensing means having a component that provides a signal during the entire time that a wheel of the moving vehicle is passing through a zone at which said component of said another wheel sensing means is located, said component of said another wheel sensing means being located beside one of said first, second or third tracks with the zone spaced from one end of said weighbridge so that, when an axle of a truck of any freight car is at that end of said weighbridge, an adjacent axle of that truck is within said zone, and wherein said control means is connected to said another wheel sensing means and is further constructed: to determine for all adjacent axles of a truck of a vehicle whether where is a coincidence of a signal from said another wheel sensing means and a rapid change of output voltage from that set of load cells below that end of the weighbridge that is spaced said distance from said zone; and to provide said signal, after the total weight of the vehicle has been obtained, for a normal printout of the weight of the vehicle only if said control means has determined that there is said coincidence for all sets of adjacent axles of each truck of the vehicle.

5. The system of claim 4 to operate even if there has been no coincident count, even though all axles of the first truck of a vehicle have passed onto the weighbridge, due to a failure of operation of said first wheel sensing means, and to return the system to synchronization for the weighing of the next vehicle, said system having said control means further constructed:

to change the count of signals from said wheel sensing means to the count of rapid rises of output voltage from said first set of load cells, when the last axle of the first truck of the vehicle has passed off the weighbridge as determined, after an incrementing of a count from an initial value each time there is a rise of output voltage of said first set of load cells and after decrementing a count each time there is a rapid decrease of output voltage from said second set of load cells until that count returns to the initial value;

to determine based on the count of rapid rises of output voltage from said first set of load cells, after said return of said count to its initial value, the count representing the total number of axles of the vehicle;

to restart the count of signals from said wheel sensing means after this count equals the count representing the total number of axles of the vehicle; and to restart the count of rapid rises of output voltage from said first set of load cells when this count equals the count representing the total number of axles of the vehicle.

6. The system of claim 1, for bidirectional in-motion weighing of freight cars, said system further including:

second wheel sensing means having a component mounted beside one of said rails of said second track and spaced from said second end of said third track of said weighbridge a distance greater than the distance between axles of a track of a freight car and the distance less than the distance between the inner axles of the trucks of a freight car, said component being constructed to provide a signal at an output voltage in response to a wheel of an axle passing the location of said component of said second wheel sensing means, and wherein:

said control means is further constructed:

to count the number of rapid rises of output voltage from said second set of load cells as a count of axles of a freight car passing onto said second end of said third track of said weighbridge;

to determine a count representing the total number of axles of the freight car, when the counts of signals from said second wheel sensing means and the counts of rapid rises of output voltage from said second set of load cells are in first coincidence;

to determine when the count of the number of rapid rises of output voltage from said second set of load cells is the count representing total number of axles of the freight car;

to restart the count of signals from said second wheel sensing means whenever the count of signals from said wheel sensing means is twice its count at the time of the coincidence; and to restart the count of rapid rises of output voltage from said second set of load cells when its count is twice the count at the time of the coincidence; and said means operative in response to said control means also: for axle weighing, after said control means has counted each rapid rise of output voltage from the second set of load cells, to convert the output voltages, from said first and second sets of load cells, for said first predetermined period of time to digital information corresponding to the weight of an axle on the weighbridge and to total the weights of axles, including the weight of the axle that provides the last rapid rise of output voltage from said second set of load cells by which said control means determines that the count of rapid rises is the count representing the total number of axles of the freight car; or for truck weighing, after said control means has determined that the count of signals from said wheel sensing means and the count of rapid rises of output voltage from said second set of load cells are in said coincidence, to convert the output voltages from said first and second sets of load cells for said second predetermined period of time to digital information corresponding to the weight of a truck of the freight car on the weighbridge, to repeat the conversion for said second predetermined period of time, after said control means has determined that the count of rapid rises of output voltage is the count representing the total number of axles of the freight car, to digital information that corresponds to the weight of the other truck of the freight car on the weighbridge, and then to total the weights of the two trucks of the freight car; or for entire car weighing, after said control means has determined that the count of rises of output voltage from said second set of load cells is the count representing the total number of axles of the freight car, to convert the output voltages from said first and second sets of load cells for said third predetermined period of time to digital information corresponding to the total weight of said freight car.

7. The system of claim 6 for use in the weighing of railroad vehicles of a train having freight cars and a locomotive, wherein:

said component of said first wheel sensing means being spaced from said first end of said third track of said weighbridge a distance greater than the distance between any adjacent axles of a truck of a locomotive of any train that is to have vehicles of that train weighed by the system; and said component of said second wheel sensing means being spaced from said second end of said third track of said weighbridge a distance greater than the distance between any adjacent axles of a truck of a locomotive of any train that is to have vehicles of that train weighed by the system.

8. The system of claim 7 to operate even if there has been no coincident count, even though all axles of the first truck of a vehicle have passed into the weighbridge, due to a failure of operation of said first wheel sensing means or said second wheel sensing means, dependent upon the direction of movement of the train for the weighing of its vehicles, and to return the system to synchronization for the weighing of the next vehicle of the train, said system having said control means further constructed:

to change the count of signals from said wheel sensing means to the count of rapid rises of output voltage from said first set of load cells, when the last axle of the first truck of the vehicle has passed off the weighbridge as determined, after an incrementing of a count from an initial value each time there is a rise of output voltage of said first set of load cells and after decrementing a count each time there is a rapid decrease of output voltage from said second set of load cells until that count returns to the initial value;

to determine based on the count of rapid rises of output voltage from said first set of load cells, after said return of said count to its initial value, the count representing the total number of axles of the vehicle;

to restart the count of signals from said wheel sensing means after this count equals the count representing the total number of axles of the vehicle; and to restart the count of rapid rises of output voltage from said first set of load cells when this count equals the count representing the total number of axles of the vehicle.

9. A system for bidirectional in-motion weighing of railroad vehicles of a train having freight cars and a locomotive that comprises:

spaced first and second tracks having aligned pairs of rails;

a weighbridge, that is mounted between said first and second tracks and that has a third track, as the platform of said weighbridge, with gaps between the ends of its pair of rails and the rails of said first and second tracks, said first, second and third tracks providing a path of travel for the cars;

first and second sets of load cells, said sets being mounted under said platform on opposite sides of the central transverse plane of said weighbridge and the load cells of each set of load cells being connected to provide an output voltage corresponding to the weight of the load applied to that set of load cells and located to provide a rapid rise of output voltage from said first set of load cells when an axle passes onto the adjacent end of said weighbridge;

first wheel sensing means having a component mounted beside one of said rails of said first track and spaced from said end of said third track of said weighbridge a distance greater than the distance between adjacent axles of a truck of a freight car and the distance between any adjacent axles of a truck of a locomotive of any train that is to have vehicles of that train weighed by the system and a distance less than the distance between the inner axles of trucks of a freight car, said component being constructed to provide a signal at an output in response to a wheel of an axle passing the location of said component;

second wheel sensing means having a component mounted beside one of said rails of said second track and spaced from said second end of said third track of said weighbridge a distance greater than the distance between axles of a track of a freight car and the distance between any adjacent axles of a truck of a locomotive of any train that is to have vehicles of that train weighed by the system and the distance less than the distance between the inner axles of the trucks of a freight car, said component being constructed to provide a signal at an output voltage in response to a wheel of an axle passing the location of said component of said second wheel sensing means;

another wheel sensing means having a component that provides a signal during the entire time that a wheel of the moving vehicle is passing through a zone at which said component of said another wheel sensing means is located, said component of said another wheel sensing means being located at a zone that is at a distance from one of said first and second tracks or said third track relative to one end of said weighbridge so that, when an axle of a truck of any freight car is at that end of said weighbridge, an adjacent axle of that truck is within said zone;

controls means that is connected to said first and second sets of load cells and to said first, second and another wheel sensing means and that is constructed:

to count the signals from said first or second wheel sensing means, dependent upon the direction of train travel, as a count of the number of axles of a vehicle passing the location of said component of that wheel sensing means that is receiving said signals;

to count the number of rapid rises of output voltage from that set of load cells, adjacent to that wheel sensing means of said first and second sensing means that is counting said axles, as a count of axles of a vehicle passing on to that end of said weighbridge after passing said that wheel sensing means that is counting axles;

to determine a count representing the total number of axles of the vehicle, when the counts of signals from said that wheel sensing means, that is counting axles, and the counts of rapid rises of output voltage from that set of load cells, that is providing said number of rapid rises of output voltage, are in first coincidence;

to determine when the count of the number of rapid rises of output voltage from that set of load cells is the count representing the total number of axles of the vehicle;

to restart the count of signals from that sensing means whenever the count of signals from said that wheel sensing means is twice its count at the time of coincidence;

to restart the count of rapid rises of output voltage from that set of load cells when it count is twice the count at the time of the coincidence; and to determine for all adjacent axles of a truck of a vehicle whether there is a coincidence of a signal from said another wheel sensing means and a rapid change of output voltage from that set of load cells that are at the end of the weighbridge that is said distance from said zone at which said another wheel sensing means is located;

means operative in response to said control means:

for axle weighing, after said control means has counted each rapid rise of output voltage from said that set of load cells, to convert the output voltages, from said first and second sets of load cells, for a first predetermined period of time to digital information corresponding to the weight of an axle on the weighbridge and to total the weights of axles, including the weight of the axle that provides the last rapid rise of output volgage from said that set of load cells by which said control means determines that the count of rapid rises is the count representing the total number of axles of the vehicle; or for truck weighing, after said control means has determined that the count of signals from said wheel sensing means and the count of rapid rises of output voltage from said that set of load cells are in said coincidence, to convert the output voltages from said first and second sets of load cells for a second predetermined period of time to digital information corresponding to the weight of a truck of the vehicle on the weighbridge, to repeat the conversion for said second predetermined period of time, after said control means has determined that the count of rapid rises of output voltage is the count representing the total number of axles of the vehicle, to digital information that corresponds to the weight of the other truck of the vehicle on the weighbridge, and then to total the weights of the two trucks of the vehicle; or for entire car weighing, after said control means has determined that the count of rises of output voltage from said that set of load cells is the count representing the total number of axles of the vehicle, to convert the output voltages from said first and second sets of load cells for a third predetermined period of time to digital information corresponding to the total weight of said vehicle; and print means to print out the total weight of the vehicle in response to said control means that provides a signal after the total weight of the vehicle has been obtained, said control means being constructed also: to provide said signal, after the total weight of the vehicle has been obtained, for a normal print out of the weight of the vehicle only if said control means has determined that there is said coincidence for all sets of adjacent axles of a truck of the vehicle.

10. The system of claim 9 to operate even if there has been no coincident count, even though all axles of the first truck of a vehicle have passed into the weighbridge, due to a failure of operation of said first wheel sensing means or said second wheel sensing means, dependent upon the direction of movement of the train for the weighing of its vehicles, and to return the system to synchronization for the weighing of the next vehicle of the train, said system having said control means further constructed:

to change the count of signals from said wheel sensing means to the count of rapid rises of output voltage from said first set of load cells, when the last axle of the first truck of the vehicle has passed off the weighbridge as determined, after an incrementing of a count from an initial value each time there is a rise of output voltage of said first set of load cells and after decrementing a count each time there is a rapid decrease of output voltage from said second set of load cells until that count returns to the initial value;

to determine based on the count of rapid rises of output voltage from said first set of load cells, after said return of said count to its initial value, the count representing the total number of axles of the vehicle;

to restart the count of signals from said wheel sensing means after this count equals the count representing the total number of axles of the vehicle; and to restart the count of rapid rises of output voltage from said first set of load cells when this count equals the count representing the total number of axles of the vehicle.

11. The system of claim 1 wherein:

said control means and said means operating in response to said control means comprise:

a microprocessor including a CPU, PROMs, RAMs, a bus having a data channel with input/output data lines and an address channel with address lines, and first through fifth interfaces, said CPU being connected to the said data channel, said PROMs, RAMs and said first, third and fifth interfaces being connected to said data channel and said address channel, and said third and fourth interfaces being connected to said address channel, said wheel sensing means being connected to said first interface that passes a signal, if provided by said wheel sensing means, to said data channel when said first interface is addressed;

a high-speed multi-bit A/D converter having a number of data outputs connected to said second interface to provide digital information to said data channel when said second interface is addressed, an analog voltage input, and a trigger input that is connected to said third interface to receive a trigger signal from said address channel when said third interface is addressed; and a multiplexer having an analog voltage output connected to said analog voltage input of said A/D converter, a first analog voltage input connected to said first set of load cells to receive an analog voltage from said first set of load cells, a second analog voltage input connected to said second set of load cells, and a set of inputs connected to said fourth interface to selectively connect said first or second sets of load cells to said A/D converter, dependent upon the digital information provided to said set of inputs of said multiplexer when said address channel provides digital information to address said fourth interface and the digital information for said set of inputs of said multiplexer, said microprocessor being constructed to provide at least 30 cycles of operation per second and during each cycle:

to place on said address channel digital information that addresses said third interface and provides via said third interface, when addressed, a signal to said trigger input of said A/D converter, said trigger signal at its leading edge providing a resetting of said number of data outputs and at its trailing edge initiating a conversion for a period of time of the analog voltage from said first set of load cells via said multiplexer to digital information at said number of outputs of said A/D converter and thus to said second interface;

to place on said address channel, after said period of time of operation of said converter, an address to said second interface to place on said data channel the digital information from said A/D converter and to store in first and second address locations of said RAMs that digital information representing the weight on said weighbridge imparted to said first set of load cells;

to place on said address channel digital information that addresses said fourth interface and provides by said fourth interface, when addressed, digital information to said set of inputs of said multiplexer to connect said second set of load cells to said A/D converter;

to place on said address channel digital information that addresses said third interface and provides via said third interface, when addressed, a signal to said trigger input of said A/D converter, said trigger signal at its leading edge providing a resetting of said number of data outputs and at its trailing edge initiating a conversion for a period of time an analog voltage from second set of load cells via said multiplexer to digital information at said number of outputs of said A/D converter and thus to said second interface;

to place on said address channel, after said period of time of operation of said converter, an address to said second interface to place on said data channel the digital information from said A/D converter and to store in a third location of said RAMs that digital information representing the weight on said weighbridge imparted to said second set of load cells and to add to said second address location that digital information so that said second address location then contains digital information representing the weight on said weighbridge due to said first and second sets of load cells; and to place on said address channel digital information that addresses said first interface to pass to said data channel a signal, if present from said wheel sensing means, that is used by said microprocessor to enter a count of one axle of a freight car passing the location of said component of said wheel sensing means, and said microprocessor, in accordance with the program of said PROMs, providing various logical decisions for each cycle based on said stored digital information from said first and second sets of load cells and said stored signal, if any, from said wheel sensing means and for a number of cycles during the period of time, beginning when the first axle of a freight car enters the location of said wheel sensing means and until after the last axle of the freight car has passed onto said weighbridge and that last axle, the second truck of said freight car or the entire car has been weighed so that said microprocessor performs the stated functions of said control means and the stated operation of said means operated in response to said control means and then transfers the total weight, as digital information, of the freight car to said print means.

12. The system of claim 11 for use in the weighing of railroad vehicles as a train having freight cars and a locomotive, wherein:

said component of said wheel sensing means is spaced from said third track a distance greater than the distance between any adjacent axles of a truck of a locomotive of any train that is to have vehicles of that train weighed by the system;

said system further includes another wheel sensing means having a component that provides a signal during the entire time that a wheel of the moving vehicle is passing through a zone at which said component of said another wheel sensing means is located, said component of said another wheel sensing means being located beside one of said first, second or third tracks with the zone spaced from one end of said weighbridge so that, when an axle of a truck of any freight car is at that end of said weighbridge, an adjacent axle of that truck is within said zone, and said another wheel sensing means being connected to said first interface that passes a signal, if provided by said another wheel sensing means, to a different line of said data channel than that to which said first wheel sensing means is passing, when said first interface is addressed; and said microprocessor is further constructed: to transfer during each cycle, at the time of operation of said A/D converter for a conversion of analog voltage from said first set of load cells the digital information in said first location of the RAMs from the previous cycle to a fourth location of the RAMs and at the operation of said A/D converter for a conversion of the output of voltage from said second set of load cells the digital information in said second and third locations of the RAMs from the previous cycle to fifth and sixth locations of the RAMs;

to compare before the completion of a cycle the newly entered digital information in said first through third locations with the digital information transferred during that cycle to said fourth through sixth locations, respectively;

to determine, during each cycle, from the comparison of the digital information between said first and fourth locations, if there has been a rapid change of output voltage of said first set of load cells that indicates wheels on an axle passed on to said first end of said third track of said weighbridge after the last cycle;

to determine, during each cycle, from a comparison of the digital information between said third and sixth locations, if there has been a rapid change of output voltage of said second set of load cells that indicates wheels on an axle has passed off the other end of said third track of said weighbridge after the last cycle;

to set a first bit in a seventh location of the RAMs when, during a cycle, from the comparison of the digital information between said first and fourth locations or said third and sixth locations, it is determined that there has been a rapid change of output voltage of that set of load cells that are located adjacent to that end of said weighbridge that is said distance from said zone of said another wheel sensing means, said bit being reset in a subsequent cycle during which there is a determination that the wheel of an axle is no longer at that location;

to transfer said signal on said line of said data channel to set a first bit of a first register of a set of three registers at an eighth location of said RAMs when an axle enters said zone and in the next cycle to set a first bit of the second register at said eighth location, if said first bit of said first register is set, and to reset said first bit of said first register, and then set said bit of said first register if, during that next cycle, said axle is still within said zone and in the following cycle to set said first bit of said second register and said first bit of said third register at said eighth location, if said first bit of said first and second registers, respectively, are set and to reset said first bit of said first register, that is then set if said axle is still within said zone, said microprocessor being programmed to set a bit in a fourth register if said first bits of said three registers at said eighth location are all set, said bit of said fourth register being reset by the next cycle so that said bit of said fourth register, while set, provides an indication that an axle is being detected in said zone;

to examine, during each cycle, said first bit at said seventh location and, if said first bit in said seventh location is set and said bit of said fourth register at said eight location is not set, to set a bit in a ninth location;

to reset said first bit of said ninth location if, in a subsequent cycle after said first bit of said ninth location is set, said first bit of said seventh location and said fourth bit of said eighth location are, when examined at the same time, both set, that is the coincident condition in which adjacent axles have their wheels at the same time at the location of said zone and a location relative to that end of the weighbridge that provides weight to that set of load cells having said rapid change of output voltage to set said fourth bit of said eighth location, said condition being present for all adjacent axles of freight cars so that a normal printout of the total weight of that vehicle is permitted;

to examine said fourth bit of said eighth location, during each cycle, if said first bit of said seventh location is not set;

to examine said first bit of said ninth location, if said fourth bit in said eighth location is not set; and to examine then said first bit of said ninth location and if it is set to set a second bit of said ninth location that remains set until after the completion of the weighing of the vehicle, said second bit of said ninth location inhibiting a normal printout or providing a printout indicating that the vehicle is a locomotive because not all adjacent axles of both trucks provided a coincidence of a set of said fourth bit of said eighth location and said first bit of said seventh location to reset said first bit of said ninth location.

13. The system of claim 12 wherein said microprocessor is constructed to provide at least about 60 cycles of operation per second.

14. The system of claim 11, for bidirectional in-motion weighing of railroad vehicles of a train, including freight cars and a locomotive wherein:

said microprocessor is constructed to provide at least about 60 cycles of operation per second; and said component of said wheel sensing means is spaced from said third track a distance greater than the distance between any adjacent axles of a truck of a locomotive of any train that is to have vehicles of that train weighed by the system, said system further including:

second wheel sensing means having a component mounted beside one of said rails of said second track and spaced from said second end of said third track of said weighbridge a distance equal to that of the spacing between said first wheel sensing means and said first end of said third track of said weighbridge, and wherein:

said microprocessor is further constructed: to transfer during each cycle, at the time of operation of said A/D converter for a conversion of analog voltage from said first set of load cells the digital information in said first location of the RAMs from the previous cycle to a fourth location of the RAMs and at the operation of said A/D converter for a conversion of the output of voltage from said second set of load cells the digital information in said second and third locations of the RAMs from the previous cycle to fifth and sixth locations of the RAMs;

to compare before the completion of a cycle the newly entered digital information in said first through third locations with the digital information transferred during that cycle to said fourth through sixth locations, respectively;

to determine, during each cycle, from the comparison of the digital information between said first and fourth locations, if there has been a rapid increase of output voltage of said first set of load cells that indicates wheels on an axle passed on to said first end of said third track of said weighbridge after the last cycle;

to inhibit the transfer of digital information from said first location to said fourth location for the next two cycles after a cycle determines that there has been a rapid increase of output voltage, in order to compare the newly entered digital information in said first location during each of these two cycles with the digital information maintained in said fourth location for a determination that rapid increase of output voltage continued and, if so, there is a more positive indication that an axle has passed on to said first end of said third track of said weighbridge;

to increment a first axle-on count register in said RAMs whenever said three cycles of comparisons of digital information in said first and fourth locations provide said positive indication that an axle is on said first end of said third track of said weighbridge, said first axle-on count register providing said count of axles entering that end of the weighbridge;

to determine, during each cycle, from a comparison of the digital information between said third and sixth locations, if there has been a rapid increase of output voltage of said second set of load cells that indicates wheels on an axle has passed on to the other end of said third track of said weighbridge after the last cycle;

to inhibit the transfer of digital information from said third location to said sixth location for the next two cycles, after a cycle determines that there has been a rapid increase of output voltage, in order to compare the newly entered digital information in said third location during each of these two cycles with the digital information maintained in said fifth location, for a determination that the rapid increase of output voltage continued and, if so, there is a more positive indication that an axle has passed on to said second end of said third track of said weighbridge; and to increment a second axle-on count register in said RAMs whenever said three cycles of comparisons of digital information in said third and fifth locations provide said positive indication that an axle is on said second end of said third track of said weighbridge, said second axle-on count register providing said count of axles entering that end of the weighbridge.

15. The system of claim 14 wherein:

said system further includes another wheel sensing means having a component that provides a signal during the entire time that a wheel of the moving vehicle is passing through a zone at which said component of said another wheel sensing means is located, said component of said another wheel sensing means being located beside one of said first, second or third tracks with the zone spaced from one end of said weighbridge so that, when an axle of a truck of any freight car is at that end of said weighbridge, an adjacent axle of that truck is within said zone, and said another wheel sensing means being connected to said first interface that passes a signal, if provided by said another wheel sensing means, to a different line of said data channel than that to which said first wheel sensing means is passing, when said first interface is addressed; and said microprocessor is further constructed: to inhibit the transfer of digital information from said first location to said fourth location for the next two cycles after a cycle determines that there has been a rapid increase of output voltage in order to compare the newly entered digital information in said first location during each of these two cycles with the digital information maintained in said fourth location for a determination that rapid increase of output voltage continued and, if so, there is a more positive indication that an axle has passed on to said first end of said third track of said weighbridge;

to set a first on-axle bit in a seventh location of the RAMs when, during a cycle, from the comparison of the digital information between said first and fourth locations it is determined that there has been a rapid increase of output voltage of that set of load cells that are located adjacent to said first end of said weighbridge, said first on-axle bit being reset in a subsequent cycle during which there is a determination that the wheel of an axle is no longer at that location;

to inhibit the transfer of digital information from said first location to said fourth location for the next two cycles after a cycle determines that there has been a rapid decrease of output voltage, in order to compare the newly entered digital information in said first location during each of these two cycles with the digital information maintained in said fourth location for a determination that the rapid decrease of output voltage continued and, if so, there is a more positive indication that an axle has passed off said first end of said third track of said weighbridge;

to set a first off-axle bit in said seventh location of the RAMs when, during a cycle, from the comparison of the digital information between said first and fourth locations it is determined that there has been a rapid decrease of output voltage of that set of load cells that are located adjacent to said first end of said weighbridge, said first off-axle bit being reset in a subsequent cycle during which there is a determination that the wheel of an axle is no longer at that location;

to inhibit the transfer of digital information from said third location to said sixth location for the next two cycles after a cycle determines that there has been a rapid increase of output voltage in order to compare the newly entered digital information in said third location during each of these two cycles with the digital information maintained in said sixth location for a determination that rapid increase of output voltage continued and, if so, there is a more positive indication that an axle has passed on to said second end of said third track of said weighbridge;

to set a second on-axle bit in said seventh location of the RAMs when, during a cycle, from the comparison of the digital information between said third and sixth locations it is determined that there has been a rapid increase of output voltage of that set of load cells that are located adjacent to said second end of said weighbridge, said second on-axle bit being reset in a subsequent cycle during which there is a determination that the wheel of an axle is no longer at that location;

to inhibit the transfer of digital information from said third location to said sixth location for the next two cycles after a cycle determines that there has been a rapid decrease of output voltage, in order to compare the newly entered digital information in said third location during each of these two cycles with the digital information maintained in said sixth location for a determination that the rapid decrease of output voltage continued and, if so, there is a more positive indication that an axle has passed off said second end of said third track of said weighbridge;

to set a second off-axle bit in said seventh location of the RAMs when, during a cycle, from the comparison of the digital information between said third and sixth locations it is determined that there has been a rapid decrease of output voltage of that set of load cells that are located adjacent to said second end of said weighbridge, said second off-axle bit being reset in a subsequent cycle during which there is a determination that the wheel of an axle is no longer at that location;

to determine, during each cycle, if said zone is located beside said first track or said third track and spaced said distance from said first end of said weighbridge, when said first on-axle bit in said seventh location is set, whether an adjacent axle at that time is at the zone of said another wheel sensing means, that occurs as a coincidence of presence of adjacent axles of a truck such as those of a freight car, each of said determinations of coincidence resetting a bit in another location of said RAMS that is set by an axle before each determination for a vehicle so that there will be the normal print out provided this coincidence occurs for all adjacent axles of each truck of the vehicle;

to determine, during each cycle, if said zone is located beside said second track or said third track and spaced said distance from said second end of said weighbridge, when said second on-axle bit in said seventh location is set, whether an adjacent axle at that time is at the zone of said another wheel sensing means, that occurs as a coincidence of presence of adjacent axles of a truck such as those of a freight car, each of said determinations of coincidence resetting said bit in another location of said RAMs that is set by an axle before each determination for a vehicle so that there will be the normal print out provided this coincidence occurs for all adjacent axles of a truck of the vehicle;

to determine, during each cycle, if said zone is located beside said first track or said third track and spaced said distance from said first end of said weighbridge, when said first off-axle bit in said seventh location is set, whether an adjacent axle at that time is at the zone of said another wheel sensing means, that occurs as a coincidence of presence of adjacent axles of a truck such as those of a freight car, each of said determinations of coincidence resetting a bit in another location of said RAMs that is set by an axle before each determination for a vehicle so that there will be the normal print out provided this coincidence occurs for all adjacent axles of a truck of the vehicle; and to determine, during each cycle, if said zone is located beside said second track or said third track and spaced said distance from said second end of said weighbridge, when said second off-axle bit in said seventh location is set, whether an adjacent axle at that time is at the zone of said another wheel sensing means, that occurs as a coincidence of presence of adjacent axles of a truck such as those of a freight car, each of said determinations of coincidence resetting said bit in another location of said RAMs that is set by an axle before each determination for a vehicle so that there will be the normal print out provided this coincidence occurs for all adjacent axles of a truck of the vehicle.

16. The system of claim 15 wherein said bit in said another location is set during a cycle in which there is set one of said on-axle bits and said off-axle bits in said seventh location, that has been set by an axle passing on to or off said weighbridge, dependent upon the location of said another wheel sensing means and said train direction of travel, if there is no signal, at that time during the cycle, that another axle is at said zone, said microprocessor being further constructed and programmed:

to set a bit in an eighth location, if during each of three successive cycles, said another wheel sensing menas provides a signal that a wheel of an axle is at said zone and to reset said bit in said eighth location during the next cycle; and to set, during a cycle, a bit in a flag register of said microprocessor, if said bit in said another location is set and if, due to lack of said coincidence by adjacent axles of a truck of a vehicle, the appropriate one of said axle bits in said seventh location is set, said bit in said flag register being used, when set, to inhibit a print out of the weight of the vehicle or to print out the weight with an indicia that the vehicle is a locomotive.

17. The system of claim 16 wherein said microprocessor is constructed to provide a normal print out only if said coincidence of all adjacent axles of a truck occurs for both trucks of the vehicle.

18. The system of claim 16 wherein said microprocessor is constructed to provide at least about 60 cycles of operation per second.

19. The system of claim 15 in which said microprocessor is further constructed:

to increment an axle-on-weighbridge count register each time that said first on-axle bit or said second on-axle bit in said seventh location is set and to decrement said axle-on-weighbridge count register each time that said first off-axle bit or said second off-axle bit in said seventh location is set; and to delay each weighing of an axle of a vehicle, for axle weighing, when an axle enters said weighbridge, if the count of said axle-on-weighbridge count register is not one, until there is a count of one; or to delay each weighing of a truck of a vehicle, for truck weighing, when the last axle of a truck enters said weighbridge, if the count of said axle-on-weighbridge count register is not equal to one-half of the count determined as the number of axles of said vehicle, until the count of said axle-on-weighbridge count register is equal to one-half of said number of axles of said vehicle; or to delay the weighing, for entire vehicle weighing, when the last axle of the vehicle enters said weighbridge, if the count of said axle-on-weighbridge count register is not the count determined as the number of axles of said vehicle, until said count of said axle-on-weighbridge count register equals said number of axles of said vehicle, so that a weighing operation is not performed until only the axle or axles to be weighed are on said weighbridge.

20. The system of claim 14 to operate even if there has been no coincident count, even though all axles of the first truck of a vehicle have passed on to the weighbridge, due to a failure of operation of said first wheel sensing means or said second wheel sensing means, dependent upon the direction of movement of the train for the weighing of its vehicles, and to return the system to synchronization for the weighing of the next vehicle of the train, said system having said microprocessor being further constructed:

to determine from the output voltages of said first and second sets of load cells that, during a cycle, there is no load on said weighbridge when the last axle of the first truck of the vehicle has moved off said weighbridge; and to set the count stored in said microprocessor of axles of a vehicle, that have passed said component of said first wheel sensing means or said second wheel sensing means, dependent upon the direction of travel of the vehicle, to the count of axles, of the vehicle that have passed on to said weighbridge, at the time of said determination that there is said no load on said first and second sets of load cells.

21. The system of claim 20 wherein said microprocessor is constructed to provide at least 60 cycles of operation per second.

22. In a system for in-motion weighing of freight cars having spaced first and second track sections and a weighbridge with a track section that is mounted between said first and second track sections, and first and second sets of load cells, said sets being mounted under said weighbridge on opposite sides of the central transverse vertical plane of said weighbridge and the load cells of each set of load cells being connected to provide an output voltage corresponding to the weight of the load applied to that set of load cells when an axle is on said weighbridge:

means for axle, truck or entire car weighing including, in combination:

wheel sensing means mounted beside said first track section and spaced from the adjacent end of said weighbridge a distance greater than the distance between adjacent axles of a truck of a freight car and a distance less than the distance between the inner axles of trucks of a freight car, for providing a signal in response to a wheel of an axle passing said wheel sensing means, control means that is connected to said first and second sets of load cells and to said wheel sensing means, including:

first means for counting the signals from said wheel sensing means as a count of the number of axles of a freight car passing said wheel sensing means;

second means responsive to the output voltages from said first set of load cells for counting axles of a freight car passing on to said adjacent end of said weighbridge; and means for determining a first coincident count between said first and second counting means;

for axle weighing, means operative in response to the output voltage of said first set of load cells when an axle enters the weighbridge from said first track section for initiating a weighing operation utilizing the output of both of said sets of load cells, and means for accumulating the weights of successive weighing operations for a number of axles equal to twice said first coincident count for a total car weights; or for truck weighing, means operative in response to said first coincident count to initiate a first weighing operation utilizing the output of both of said sets of load cells, for initiating a second weighing operation when the count of said second counting means is twice the coincident count, and for accumulating the weight of said first and second weighing operations for a total car weight; or for entire car weighing, means operative in response to said second counting means when its count equals twice said first coincident count for initiating a weighing operation utilizing the output of both of said sets of load cells for a total weight; and means for recording the total weight of the freight car in response to said control means.

23. In a system for in-motion weighing of freight cars of a train having a locomotive, said system having spaced first and second track sections and a weighbridge with a track section that is mounted between said first and second track sections, the combination comprising:

first and second sets of load cells, said sets being mounted under said weighbridge on opposite sides of the central transverse vertical plane of said weighbridge and the load cells of each set being connected to provide an output voltage representing the weight of the load applied to that set when an axle passes on to said weighbridge;

means responsive to the output voltages from said first set of load cells for detecting and providing signals representing axles passing on to the adjacent end of said weighbridge in one direction of train movement or passing off said adjacent end of said weighbridge in the other direction of train movement;

wheel sensing means located adjacent one of said track sections to sense a wheel on an axle passing through a zone, that is spaced from said adjacent end of said weighbridge a distance, so that the distance from at least one point in the zone to said adjacent end of said weighbridge is equal to the spacing of all adjacent axles of a truck of each freight car of the train but the distance from no point in the zone to said adjacent end of said weighbridge is equal to the distance between at least one set of adjacent axles of a truck of a locomotive, for sensing and providing signals representing passing wheels;

means utilizing the output voltages from both sets of load cells for performing weighing operations to obtain separately the total weight of freight cars and locomotives of a train passing over said weighbridge in either direction;

means for recording said total weight; and means for comparing a first signal from said axle detection means and a second signal from said wheel sensing means and operative in either direction of train movement for controlling the operation of said weight recording means to record the total weights of freight cars responsive to coincidence between said first and second signals and, selectively, to record or not record the total weights of locomotives responsive to lack of coincidence between said first and second signals.

24. A system for in-motion weighing of freight cars that comprises:

spaced first and second tracks having aligned pairs of rails;

a weighbridge, that is mounted between said first and second tracks and that has a third track, as the platform of said weighbridge, with gaps between the ends of its pair of rails and the rails of said first and second tracks, said first, second and third tracks providing a path of travel for the cars;

first and second sets of load cells, said sets being mounted under said platform on opposite sides of the central transverse plane of said weighbridge and the load cells of each set of load cells being connected to provide an output voltage corresponding to the weight of the load applied to that set of load cells and loacated to provide a rapid change of output voltage from said first set of load cells when an axle passes onto the adjacent end of said weighbridge;

wheel sensing means having a component mounted beside one of said rails of said first track and spaced from said first end of said third track of said weighbridge a distance greater than the distance between adjacent axles of a truck of a freight car and a distance less than the distance between the inner axles of trucks of a freight car, said component being constructed to provide a signal at an output in response to a wheel of an axle passing the location of said component;

control means that is connected to said first and second sets of load cells and to said wheel sensing means and that is constructed:

to count the signals from said wheel sensing means as axles pass the location of said component of said wheel sensing means;

to count each rapid change of output voltage from said first set of load cells as axles of the same freight car pass onto said adjacent end of said weighbridge;

to determine, as a first concident count, the number of axles of the first truck of that freight car when the count of signals from said wheel sensing means and the count of rapid changes of output voltage from said first set of load cells are equal;

to determine, from said first coincident count and from subsequent signals from said wheel sensing means, when the last axle of the second truck of the freight car is passing said location of said component of said wheel sensing means;

to determine, from said first coincident count and from subcounts of rapid change of output voltage from said first set of load cells, when the last axle of the second truck of that freight car has passed onto said adjacent end of said weighbridge;

to restart the count of signals from said wheel sensing means whenever it is determined that said last axle is passing said location of said component of said wheel sensing means; and to restart the count of rapid changes of output voltage from said first set of load cells whenever it is determined that said last axle has passed onto said adjacent end of said weighbridge;

means operative in response to said control means:

for axle weighing, each time said control means has counted a rapid change of output voltage from said first set of load cells, to convert the output voltages, from said first and second sets of load cells, for a first predetermined period of time to digital information corresponding to the weight of an axle of a freight car on the weighbridge and to total the weights of axles, including the weight of the last axle, of that freight car; or for truck weighing, after said control means has determined said first coincident count for a freight car, to convert the output voltages from said first and second sets of load cells for a second predetermined period of time to digital information corresponding to the weight of said first truck of that freight car on the weighbridge, to repeat the conversion for said second predetermined period of time, after said control means has determined that said last axle has passed onto said adjacent end of said weighbridge, to digital information that corresponds to the weight of said second truck of that freight car on the weighbridge, and then to total the weights of the two trucks of that freight car; or for entire car weighing, after said control means has determined that said last axle of said second truck of a freight car has passed onto said adjacent end of said weighbridge, to convert the output voltages from said first and second sets of load cells for a third predetermined period of time to digital information corresponding to the total weight of that freight car; and print means to print out the total weight of the freight car in response to said control means that provides a signal after the total weight of the freight car has been obtained.

25. The system of claim 24 wherein said construction of said control means to count each rapid change of said output voltage is constructed to count each rapid rise of said output voltage from said first set of load cells.

26. The system of claim 25 wherein said system further includes:

another wheel sensing means having a component that provides a signal during the entire time that a wheel of the moving vehicle is passing through a zone at which said component of said another wheel sensing means is located, said component of said another wheel sensing means being located beside one of said first, second or third tracks with the zone spaced from one end of said weighbridge so that, when an axle of a truck of any freight car is at that end of said weighbridge, an adjacent axle of that truck is within said zone, and wherein said control means is connected to said another wheel sensing means and is further constructed:

to determine for all adjacent axles of a truck of a vehicle whether there is a coincidence of a signal from said another wheel sensing means and said change of output voltage from that set of load cells below that end of the weighbridge that is spaced said distance from said zone; and to provide said signal, after the total weight of the vehicle has been obtained, for a normal printout of the weight of the vehicle only if said control means has determined that there is said coincidence for all sets of adjacent axles of each truck of the vehicle.

27. In a system for in-motion weighing of freight cars moving along a track having a track section on a weighbridge, said system having first and second sets of load cells mounted on said weighbridge at the entrance and exit portions of said weighbridge, that provide a rapid change of voltage signals when an axle enters and leaves, respectively, said weighbridge and that have their voltage signals used for a weighing operation while a predetermined number of axles are on said weighbridge, the improvement by additionally including:

wheel sensing means at said track upstream from said weighbridge a predetermined distance;

first data storage register means, connected to said wheel sensing means, for storing electrical signals representing axles detected by said wheel sensing means;

second data storage register means, connected to said first set of load cells, for storing electrical signals, each representing a rapid change of voltage signal from said first set of load cells when an axle enters said weighbridge;

total data storage register means, connected to both sets of load cells, for storing digital information representing the voltage signals from both sets of load cells for the number of weighing operations required to weigh one of said freight cars; and control logic means connected to said wheel sensing means, to said first and second data storage register means, and to said total data storage register means, for effectuating said storage operations of said electrical signals from said wheel sensing means and from said first set of load cells and of said digital information based on voltage signals from both of said sets of load cells, for comparing stored electrical signals in said first and second data storage register means to provide a digital signal based upon their relative signal status, and for comparing said digital signal with electrical signals in said second data storage means to initiate a transfer of digital information from said total data storage register means after completion of the weighing operations required to weigh said freight car.

28. The system of claim 27 wherein said first and second data storage register means comprise first and second counting means, respectively, and said control logic means provides a comparison of the count in said first counting means with the count in said second counting means to determine the digital count representing the number of axles of a truck of the freight car being weighed, said digital count being compared with said count in said second counting means to provide, after a predetermined relationship, said initiation of the transfer of digital information from said total data storage register means after completion of the weighing operations required to weigh said freight car.

29. The system of claim 28 wherein said second data storage register means stores electrical signals, each representing a rapid rise of voltage signal from said first set of load cells when an axle enters said weighbridge.

30. In a system for in-motion weighing of freight cars of a train having a locomotive and moving along a track having a track section on a weighbridge, said system having first and second sets of load cells mounted on said weighbridge at the entrance and exit portions of said weighbridge, that provide a rapid change of voltage signals when an axle enters and leaves, respectively, said weighbridge and that have their voltage signals used for a weighing operation while a predetermined number of axles are on said weighbridge, the improvement by additionally including:

wheel sensing means located adjacent one end of said weighbridge and adjacent one of said first and second sets of load cells to sense a wheel on an axle passing through a zone, that is spaced from said adjacent end of said weighbridge a distance, so that the distance from at least one point in the zone to said adjacent end of said weighbridge is equal to the spacing of all adjacent axles of a truck of each freight car of the train but the distance from no point in the zone to said adjacent end of said weighbridge is equal to the distance between at least one set of adjacent axles of a truck of a locomotive, for sensing and providing signals representing passing wheels;

means connected to said adjacent set of load cells for detecting and providing signals representing axles passing on to or off said adjacent end of said weighbridge; and means for comparing a first signal from said axle-detecting means, connected to said first set of load cells, and a second signal from said wheel sensing means and operative in either direction of train movement for controlling the operation of recording a total vehicle weight so that there will be a recording in response to coincidence between said first and second signal for all adjacent axles of each truck of a freight car and, selectively, a recording or no recording for a locomotive in response to lack of coincidence between said first and second signals.

31. In a system for in-motion weighing of freight cars moving along a track having a track section on a weighbridge, said system having first and second sets of load cells mounted on said weighbridge at the entrance and exit portions of said weighbridge, that provide a rapid change of voltage signals when an axle enters and leaves, respectively, said weighbridge and that have their voltage signals used for a weighing operation while a predetermined number of axles are on said weighbridge, the improvement by additionally including:

wheel sensing means at said track upstream from said weighbridge a predetermined distance for detecting axles;

means connected to said first set of load cells to detect each axle entering said weighbridge based on a rapid change of voltage signal from said first set of load cells; and means connected to both sets of load cells to perform a weighing operation based on the voltage signals from both sets of load cells.

32. The system of claim 31 and further including:

means connected to said wheel sensing means and to said means for detecting said rapid changes of voltage signals from said first set of load cells for determining the number of axles of a truck of the freight car having its axles detected.

33. The system of claim 32 and still further including:

means connected to said axle-number-detecting means and to said means for detecting said rapid changes of voltage signals to determine at least when the last weighing operation performed for a freight car by said means connected to both sets of load cells is performed.

34. The system of claim 31 wherein said means connected to said first set of load cells to detect each axle entering said weighbridge provides each detection based on three consecutive samples of rapid rise of voltage signal from said first set of load cells.

* * * * *

UNITED STATES PATENT AND TRADEMARK OFFICE
CERTIFICATE OF CORRECTION

PATENT NO. : 4,134,464
DATED : January 16, 1979
INVENTOR(S) : Bernard A. Johnson et al.

It is certified that error appears in the above-identified patent and that said Letters Patent are hereby corrected as shown below:

Column 2, line 26, "freight" should read -- freight car --.
Column 5, line 49, "truck" should read -- track --.
Column 8, line 8, "betwen" should read -- between --.
Column 9, line 15, "converter 18'" should read
-- converter 18 --.
Line 16, "multiplexer 18"" should read
-- multplexer 18' --.
Column 12, line 50, "than" should read -- then --.
Column 16, lines 19 and 27, delete the lambda symbol.
Column 21, line 21, "track" should read -- truck --.
Column 23, line 43, "track" should read -- truck --.
Column 24, line 30, "it count" should read -- its count --.
Line 48, "volgage" should read -- voltage --.
Column 28, line 58, "eight" should read -- eighth --.
Column 33, line 17, "menas" should read -- means --.
Column 34, line 68, "weights" should read -- weight --.
Column 36, line 13, "loacated" should read -- located --.
Line 48, "subcounts" should read
-- subsequent counts --.

Signed and Sealed this

Twelfth Day of June 1979

[SEAL]

Attest:

RUTH C. MASON
Attesting Officer

DONALD W. BANNER
Commissioner of Patents and Trademarks